US012275638B2

(12) United States Patent
Hill et al.

(10) Patent No.: US 12,275,638 B2
(45) Date of Patent: *Apr. 15, 2025

(54) SYSTEMS AND METHODS FOR INCREASING THE HYDROGEN PERMEANCE OF HYDROGEN SEPARATION MEMBRANES IN SITU

(71) Applicant: H2 PowerTech, LLC, Bend, OR (US)

(72) Inventors: Charles R. Hill, Bend, OR (US); Christopher J. Wright, Bend, OR (US); William A. Pledger, Bend, OR (US)

(73) Assignee: H2 PowerTech, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,674

(22) Filed: Mar. 22, 2024

(65) Prior Publication Data

US 2024/0228277 A1 Jul. 11, 2024

Related U.S. Application Data

(60) Continuation of application No. 18/169,795, filed on Feb. 15, 2023, now Pat. No. 11,999,621, which is a
(Continued)

(51) Int. Cl.
*C01B 3/50* (2006.01)
*B01D 53/22* (2006.01)
(Continued)

(52) U.S. Cl.
CPC .............. *C01B 3/503* (2013.01); *B01D 53/22* (2013.01); *B01D 65/02* (2013.01);
(Continued)

(58) Field of Classification Search
CPC .......... B01J 7/00; B01J 19/2475; B01J 8/006; C01B 2203/0233; C01B 2203/041;
(Continued)

(56) References Cited

U.S. PATENT DOCUMENTS 2,824,620 A 2/1958 De Rosset
3,336,730 A 8/1967 McBride et al.
(Continued)

FOREIGN PATENT DOCUMENTS

JP 2000-140584 A 5/2000
JP 2005-154220 A 6/2005
(Continued)

OTHER PUBLICATIONS

Musket, R.G., Effects of Contamination on the Interaction of Hydrogen Gas with Palladium: A Review, Journal of Less-Common Metals, 45, 173-183 (1976).
(Continued)

*Primary Examiner* — Jafar F Parsa
(74) *Attorney, Agent, or Firm* — KOLITCH ROMANO DASCENZO GATES LLC

(57) ABSTRACT

Hydrogen-producing fuel processing systems and related methods. The systems include a hydrogen-producing region configured to produce a mixed gas stream from a feedstock stream, a hydrogen-separation membrane module having at least one hydrogen-selective membrane and configured to separate the mixed gas stream into a product hydrogen stream and a byproduct stream, and an oxidant delivery system configured to deliver an oxidant-containing stream to the hydrogen-separation membrane module in situ to increase hydrogen permeance of the hydrogen-selective membrane. The methods include operating a hydrogen-producing fuel processing system in a hydrogen-producing regime, and subsequently operating the hydrogen-producing fuel processing system in a restoration regime, in which an oxidant-containing stream is delivered to the hydrogen-separation membrane module in situ to expose the at least one hydrogen-selective membrane to the oxidant-containing
(Continued)

stream to increase the hydrogen permeance of the at least one hydrogen-selective membrane.

24 Claims, 3 Drawing Sheets

Related U.S. Application Data division of application No. 17/079,312, filed on Oct. 23, 2020, now Pat. No. 11,618,676.

(51) Int. Cl.
*B01D 65/02* (2006.01)
*B01D 71/02* (2006.01)
*B01J 7/00* (2006.01)
*C01B 3/32* (2006.01)

(52) U.S. Cl.
CPC .......... *B01D 71/02231* (2022.08); *B01J 7/00* (2013.01); *C01B 3/32* (2013.01); *B01D 2321/18* (2013.01); *C01B 2203/0233* (2013.01); *C01B 2203/041* (2013.01)

(58) Field of Classification Search
CPC ...... C01B 2203/0283; C01B 2203/049; C01B 2203/066; C01B 2203/1223; B01D 69/02; B01D 2256/12; B01D 2257/504; B01D 2257/502

See application file for complete search history.

(56) References Cited

U.S. PATENT DOCUMENTS

| | | | |
|---|---|---|---|
| 3,338,681 A | 8/1967 | Kordesch | |
| 3,350,176 A | 10/1967 | Green et al. | |
| 3,469,944 A | 9/1969 | Bocard et al. | |
| 3,522,019 A | 7/1970 | Buswell et al. | |
| 3,655,448 A | 4/1972 | Setzer | |
| 4,098,959 A | 7/1978 | Fanciullo | |
| 4,098,960 A | 7/1978 | Gagnon | |
| 4,175,165 A | 11/1979 | Adlhart | |
| 4,214,969 A | 7/1980 | Lawrance | |
| 4,468,235 A | 8/1984 | Hill | |
| 5,084,073 A | 1/1992 | Prasad | |
| 5,104,425 A | 4/1992 | Rao et al. | |
| 5,240,473 A | 8/1993 | Carolan et al. | |
| 5,401,589 A | 3/1995 | Palmer et al. | |
| 5,432,710 A | 7/1995 | Ishimaru et al. | |
| 5,637,414 A | 6/1997 | Inoue et al. | |
| 5,733,435 A | 3/1998 | Prasad et al. | |
| 5,861,137 A | 1/1999 | Edlund | |
| 5,997,594 A | 12/1999 | Edlund et al. | |
| 6,083,637 A | 7/2000 | Walz et al. | |
| 6,221,117 B1 | 4/2001 | Edlund et al. | |
| 6,319,306 B1 | 11/2001 | Edlund et al. | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,494,937 B1 | 12/2002 | Edlund et al. | |
| 6,495,277 B1 | 12/2002 | Edlund et al. | |
| 6,537,352 B2 | 3/2003 | Edlund et al. | |
| 6,562,111 B2 | 5/2003 | Edlund et al. | |
| 6,569,227 B2 | 5/2003 | Edlund et al. | |
| 6,723,156 B2 | 4/2004 | Edlund et al. | |
| 6,811,908 B2 | 11/2004 | Edlund et al. | |
| 6,835,481 B2 | 12/2004 | Dickman et al. | |
| 6,890,672 B2 | 5/2005 | Dickman et al. | |
| 6,979,507 B2 | 12/2005 | Edlund et al. | |
| 7,128,769 B2 | 10/2006 | Renn | |
| 7,135,048 B1 | 11/2006 | Edlund et al. | |
| 7,208,241 B2 | 4/2007 | Edlund et al. | |
| 7,390,587 B2 | 6/2008 | Dickman et al. | |
| 7,601,302 B2 | 10/2009 | Edlund et al. | |
| 7,659,019 B2 | 2/2010 | Edlund | |
| 8,673,510 B2 | 3/2014 | Pledger | |
| 10,476,093 B2 | 11/2019 | Hill et al. | |
| 2001/0045061 A1 | 11/2001 | Edlund et al. | |
| 2003/0192251 A1 | 10/2003 | Edlund et al. | |
| 2003/0223926 A1 | 12/2003 | Edlund et al. | |
| 2004/0142220 A1 | 7/2004 | Brenner et al. | |
| 2004/0194384 A1 | 10/2004 | Nguyen | |
| 2005/0008909 A1 | 1/2005 | Kaye et al. | |
| 2005/0106431 A1 | 5/2005 | Edlund et al. | |
| 2005/0106445 A1 | 5/2005 | Mitchell et al. | |
| 2005/0266284 A1 | 12/2005 | Scharf | |
| 2005/0266285 A1 | 12/2005 | Edlund et al. | |
| 2006/0024540 A1 | 2/2006 | LaVen et al. | |
| 2006/0134473 A1 | 6/2006 | Edlund et al. | |
| 2007/0093382 A1 | 4/2007 | Vanderspurt et al. | |
| 2007/0180991 A1 | 8/2007 | Chellappa et al. | |
| 2008/0138679 A1 | 6/2008 | Iijima et al. | |
| 2008/0176118 A1 | 7/2008 | Edlund et al. | |
| 2008/0210088 A1 | 9/2008 | Pledger | |
| 2009/0155642 A1 | 6/2009 | Popham | |
| 2010/0136453 A1 | 6/2010 | Edlund | |
| 2012/0088168 A1 | 4/2012 | Pledger | |
| 2019/0273275 A1 | 9/2019 | Hicks | |

FOREIGN PATENT DOCUMENTS

| | | |
|---|---|---|
| JP | 2010-111543 A | 5/2010 |
| WO | WO2016178849 A1 | 11/2016 |

OTHER PUBLICATIONS

Roa et al., The Effect of Air Exposure on Palladium-Copper Composite Membranes, Applied Surface Science, 240, 85-104 (2005).

Way, J.D., Palladium/Copper Alloy Composite Membranes for High Temperature Hydrogen Separation from Coal-Derived Gas Streams, Annual Progress Report for DOE Grant DE-FG26-99FT40585 (2004).

English-language abstract of Japanese Patent Publication No. JP2000-140584, May 23, 2000.

English-language abstract of Japanese Patent Publication No. JP2005-154220, Jun. 16, 2005.

English-language abstract of Japanese Patent Publication No. JP2010-111543, May 20, 2010.

SYSTEMS AND METHODS FOR INCREASING THE HYDROGEN PERMEANCE OF HYDROGEN SEPARATION MEMBRANES IN SITU

RELATED APPLICATIONS

This application is a continuation of and claims priority to U.S. patent application Ser. No. 18/169,795, which was filed on Feb. 15, 2023, which is a divisional of and claims priority to U.S. patent application Ser. No. 17/079,312, which was filed Oct. 23, 2020, issued as U.S. Pat. No. 11,618,676 on Apr. 4, 2023, and the disclosures of which are hereby incorporated by reference.

FIELD OF THE DISCLOSURE

The present disclosure relates to systems and methods for increasing the hydrogen permeance of hydrogen-separation membrane modules in situ.

BACKGROUND OF THE DISCLOSURE

Hydrogen-producing fuel processing systems are systems that generate a product hydrogen gas stream from a carbon-containing feedstock. The hydrogen gas may be stored or utilized as fuel for various energy-producing devices, such as fuel cell stacks and the like. Hydrogen-producing fuel processing systems typically include a hydrogen-producing region that may utilize various reactions to convert the carbon-containing feedstock into a mixed gas stream that contains hydrogen gas as a majority component. A steam reformer is an example of a hydrogen-producing region that utilizes a steam reforming catalyst to react a carbon-containing feedstock stream, such as a hydrocarbon or an alcohol, with water to produce the mixed gas stream. Many hydrogen-producing fuel processing systems include a hydrogen-separation membrane module that is configured to separate the mixed gas stream into a product hydrogen stream and a byproduct stream.

Hydrogen-separation membrane modules include one or more hydrogen-selective membranes that are permeable to hydrogen gas but are impermeable to other gases, such that hydrogen-selective membranes may separate the mixed gas stream into the product hydrogen stream and the byproduct stream by selectively permitting hydrogen gas to permeate through the membrane. The efficiency and rate at which a hydrogen-producing fuel processing system generates the product hydrogen stream may be at least partially determined by the hydrogen permeance of the hydrogen-separation membrane module. Often, hydrogen-separation membrane modules are exposed, such as during manufacture or operation, to various hydrogen permeance-decreasing factors that diminish the hydrogen permeance of the hydrogen-separation membrane module. Conventionally, hydrogen-separation membrane modules are removed or uninstalled from the hydrogen-producing fuel processing system to treat or otherwise address the permeance-decreasing factors or to replace the membranes. This maintenance can be labor intensive, expensive, and may require field maintenance by a specialist or even shipment of at least the hydrogen-separation membrane module for maintenance at a specialized facility. Thus, a need exists for systems and methods for increasing the hydrogen permeance of hydrogen-separation membrane modules in situ, such as while the hydrogen-separation membrane modules are operably installed in the hydrogen-producing fuel processing systems.

SUMMARY OF THE DISCLOSURE

The present disclosure is directed to hydrogen-producing fuel processing systems and methods for increasing the hydrogen permeance of hydrogen-separation membrane modules in situ in a hydrogen-producing fuel processing system. The hydrogen-producing fuel processing system includes a hydrogen-producing region, which produces a mixed gas stream that includes hydrogen gas as a majority component, and a hydrogen-separation membrane module. The hydrogen-selective membrane module includes at least one hydrogen-selective membrane and is configured to receive at least a portion of the mixed gas stream and separate the mixed gas stream into a product hydrogen stream and a byproduct stream. The hydrogen-producing fuel processing system also includes an oxidant delivery system that is configured to selectively deliver an oxidant-containing stream to the hydrogen-separation membrane module in situ and selectively expose at least a portion of the at least one hydrogen-selective membrane to the oxidant-containing stream to increase the hydrogen permeance of the at least one hydrogen-selective membrane. The oxidant delivery system may be configured to deliver the oxidant-containing stream to the hydrogen-separation membrane module while the hydrogen-separation membrane module is operably installed in the hydrogen-producing fuel processing system.

The methods include operating a hydrogen-producing fuel processing system in a hydrogen-producing regime, and the methods further include subsequently operating the hydrogen-generating fuel processing system in a restoration region. The hydrogen-producing regime includes supplying a feedstock stream to a hydrogen-producing region, producing a mixed gas stream containing hydrogen as a majority component, and separating the mixed gas stream into a product hydrogen stream and a byproduct stream. The restoration regime includes delivering an oxidant-containing stream to the hydrogen-separation membrane module in situ and selectively exposing at least a portion of at least one hydrogen-selective membrane of the hydrogen-separation membrane module to the oxidant-containing stream to increase the hydrogen permeance of the at least one hydrogen-selective membrane.

DETAILED DESCRIPTION OF THE DISCLOSURE

Figure 1:
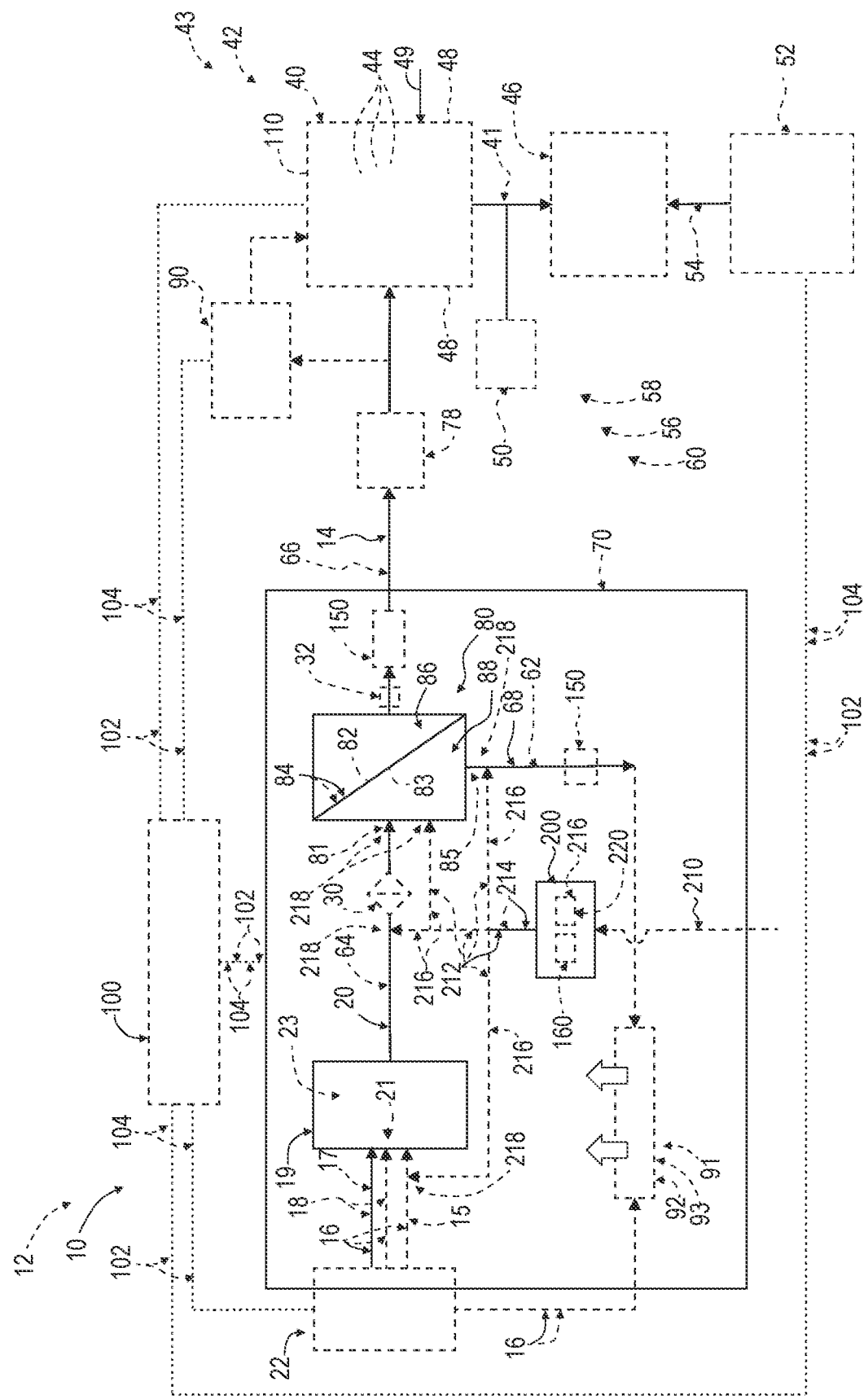
FIG. 1 is a schematic representation of examples of hydrogen-producing fuel processing systems and hydrogen-producing and consuming assemblies according to the present disclosure.
Figure 2:
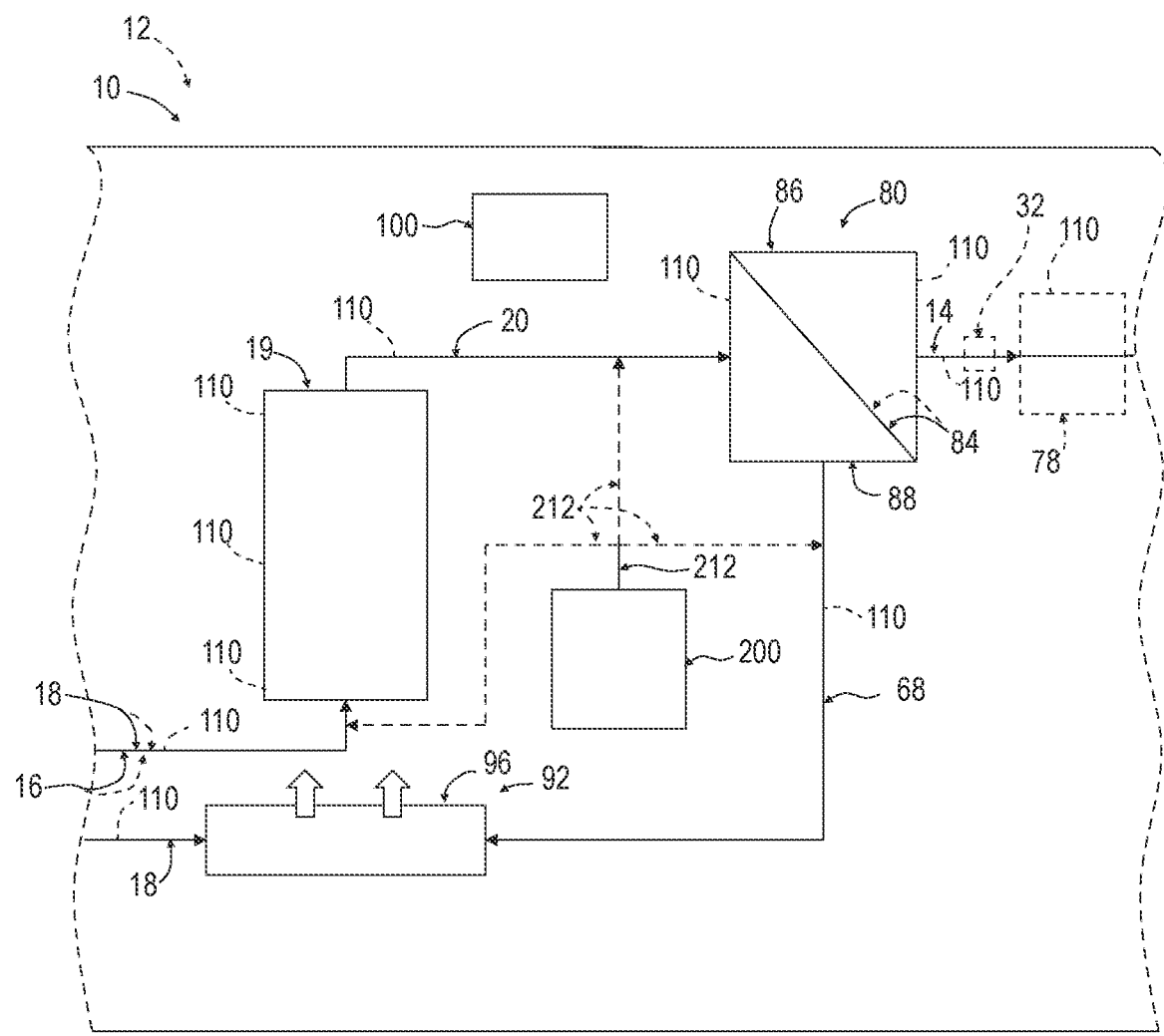
FIG. 2 is a schematic representation illustrating a portion of the examples of hydrogen-producing fuel processing systems of FIG. 1.
Figure 3:
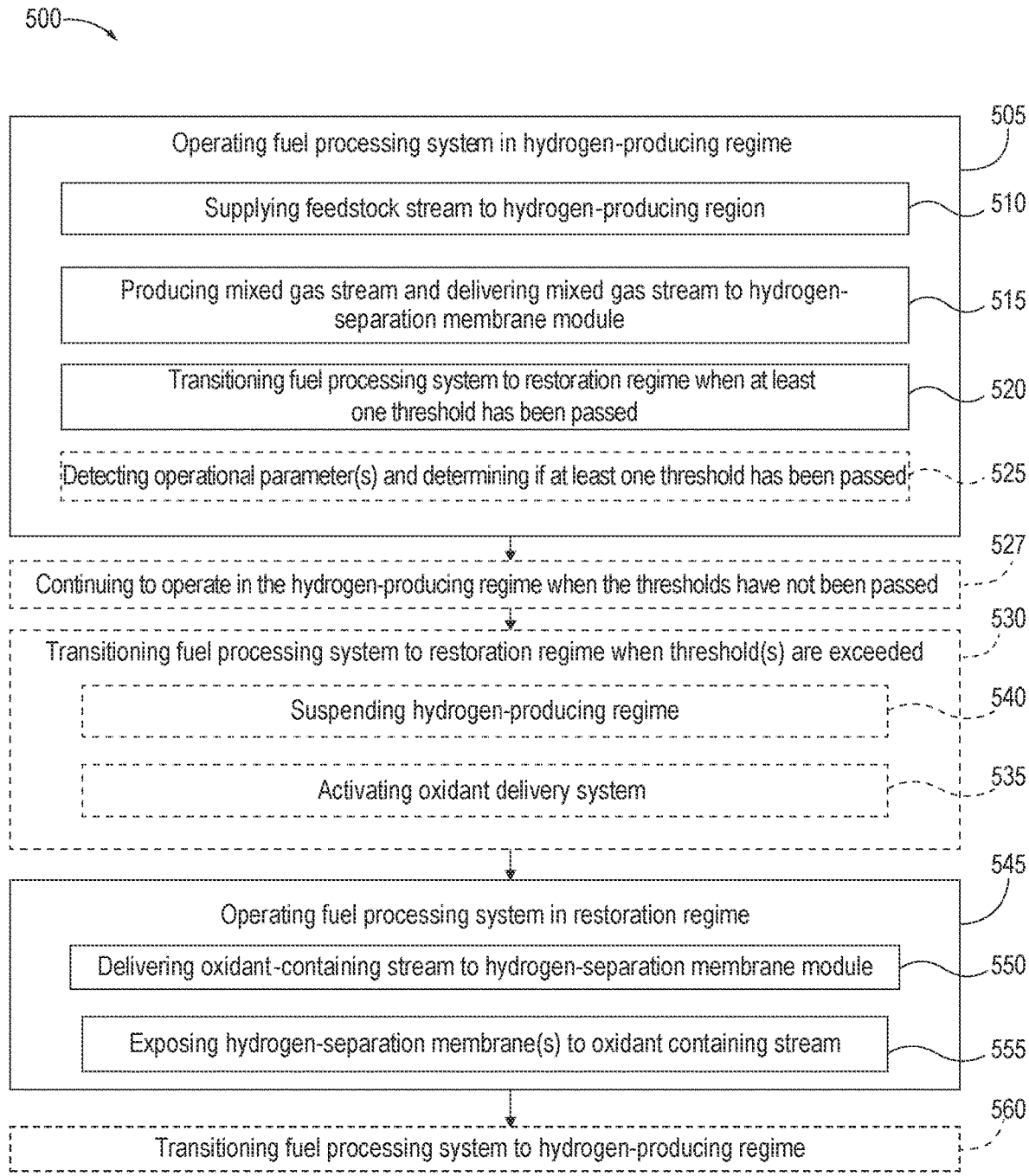
FIG. 3 is a flowchart schematically illustrating examples of methods for increasing the hydrogen permeance of a hydrogen-separation membrane module in situ in a hydrogen-producing fuel processing system, according to the present disclosure.

FIGS. 1-3 provide examples of hydrogen-producing fuel processing systems 10 having oxidant delivery systems 200, hydrogen-producing and consuming assemblies 12, and methods 500 for increasing hydrogen permeance of a hydrogen-separation membrane module in situ in a hydrogen-producing fuel processing system, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 illustrates examples of hydrogen-producing fuel processing systems 10, according to the present disclosure. Hydrogen-producing fuel processing systems 10 also may be referred to herein as fuel processing systems 10 and may form a portion of a hydrogen-producing and consuming assembly 12. Hydrogen-producing and consuming assembly 12 may include a hydrogen-consuming assembly 43, such as a fuel cell system 42 that includes one or more fuel cell stacks 40. Hydrogen-producing fuel processing systems 10 optionally may be in communication with an energy-consuming device 46, such as to provide an electrical output to satisfy an applied load from the energy-consuming device.

As shown, fuel processing system 10 includes a hydrogen-producing region 19 that is configured to receive one or more feedstock streams 16 and produce therefrom a mixed gas stream 20 that includes hydrogen gas and other gases. The one or more feed streams include at least a carbon-containing feedstock 18, and may include water 17, and/or oxygen gas 15. In particular, fuel processing system 10 may include a feedstock delivery system 22 that is configured to supply the one or more feedstock streams to hydrogen-producing region 19, such as by utilizing one or more pumps, compressors, or pressurized sources of the carbon-containing feedstock and/or water. Mixed gas stream 20 contains hydrogen gas as a majority component and contains other gases, such as carbon monoxide, carbon dioxide, methane, unreacted carbon-containing feedstock 18, and steam. By "majority component," it is meant that hydrogen gas is present in the mixed gas stream in a greater concentration, or amount, than any of the other gases. As examples, mixed gas stream 20 may include at least 50 wt %, at least 60 wt %, and/or at least 70 wt % hydrogen gas. It is within the scope of the present disclosure that the feedstock streams additionally or alternatively may be referred to with respect to the components thereof, such as including a carbon-containing feedstock stream 18, a water stream 17, and/or an oxygen gas stream 15.

Fuel processing systems 10 also include a hydrogen-separation membrane module 80 that is configured to receive mixed gas stream 20 and to separate mixed gas stream 20 into a product hydrogen stream 14 and a byproduct stream 68. Product hydrogen stream 14 contains a greater concentration of hydrogen gas than the mixed gas stream and contains a lower overall concentration of the other gases than the mixed gas stream. Product hydrogen stream 14 may contain pure or at least substantially pure hydrogen gas. As used herein, at least substantially pure hydrogen gas may be greater than 90% pure, greater than 95% pure, greater than 99% pure, greater than 99.5% pure, and/or greater than 99.9% pure. In contrast, byproduct stream 68 contains a greater overall concentration of the other gases than the mixed gas stream. The byproduct stream may contain hydrogen gas, but it contains a lower concentration of hydrogen gas than the mixed gas stream.

Hydrogen-separation membrane module 80 includes at least one hydrogen-selective membrane 84, and hydrogen-selective membrane(s) 84 are configured to separate hydrogen-separation membrane module 80 into a mixed gas region 88 and a permeate region 86. In the hydrogen-separation membrane module, mixed gas stream 20 is received within mixed gas region 88, and hydrogen-selective membrane(s) 84 are configured to permit hydrogen gas contained within mixed gas stream 20 to diffuse through hydrogen-selective membrane(s) 84 to permeate region 86 to thereby separate mixed gas stream 20 into byproduct stream 68 and product hydrogen stream 14. Stated differently, byproduct stream 68 may be described as the portion of mixed gas stream 20 that does not diffuse through hydrogen-selective membrane(s) 84 and product hydrogen stream 14 may be described as the portion of mixed gas stream 20 that diffuses through hydrogen-selective membrane 84. Hydrogen-separation membrane module 80 also may be referred to herein as membrane module 80 and/or separation assembly 80.

Fuel processing systems 10 also include an oxidant delivery system 200 that is configured to selectively deliver an oxidant-containing stream 212 to hydrogen-separation membrane module 80, in situ. More specifically, oxidant delivery system 200 is configured to selectively expose at least a portion of hydrogen-selective membrane(s) 84 to oxidant-containing stream 212 to improve the hydrogen permeance of hydrogen-selective membrane(s) 84. As discussed herein, "in situ" may refer to hydrogen-separation membrane module 80 being operably installed within, or operably interconnected within, hydrogen-producing fuel processing system 10 when oxidant delivery system 200 delivers oxidant-containing stream 212 to hydrogen-separation membrane module 80. Stated differently, oxidant delivery system 200 may be described as being configured to deliver oxidant-containing stream 212 to hydrogen-separation membrane module 80 without removing, disconnecting, and/or uninstalling hydrogen-separation membrane module 80 from fuel processing system 10. As discussed in more detail herein, increasing the hydrogen permeance of hydrogen-selective membrane(s) 84 also may be described as restoring, increasing, and/or enhancing the hydrogen permeance of hydrogen-selective membrane(s) 84 and/or of hydrogen-separation membrane module 80. Oxidant delivery system 200 thus may be described as being configured to increase the capacity of hydrogen-separation membrane module 80 to selectively transmit hydrogen from mixed gas region 88 to permeate region 86 while retaining the other gasses contained within mixed gas stream 20 (i.e., the gasses of byproduct stream 68) within mixed gas region 88.

As shown in FIG. 1, byproduct stream 68 optionally may be supplied to a heating assembly 91 that may include a burner assembly 92, which may include one or more burners. Heating assembly 91 may be configured to heat at least a portion of fuel processing system 10, such as hydrogen-producing region 19 and/or hydrogen-separation membrane module 80. For example, heating assembly 91 may be configured to heat the portion of the fuel processing system to a suitable operating temperature, or operating temperature range, for producing hydrogen gas, purifying hydrogen gas, etc. Heating assembly 91 also may be configured to heat various streams within fuel processing system 10. As an example, heating assembly 91 may include a vaporization region, or a vaporizer, that is configured to vaporize any liquid portion of feedstock stream(s) 16, such that feedstock streams 16 may be in a vaporized state when, upon, or prior to entering hydrogen-producing region 19. In some examples, heating assembly 91 additionally or alternatively may include an electric heater that is configured to maintain the portion of the fuel processing system at the operating temperature or a "primed" or "buffered" temperature, which is less than the operating temperature but greater than ambient temperature, during periods in which the hydrogen-producing region is not being utilized to produce hydrogen gas. Examples of suitable operating (i.e., hydrogen-producing and/or hydrogen-purifying), primed, and/or buffered temperature ranges and corresponding hydrogen-producing fuel cell systems and components thereof after disclosed in U.S. Pat. No. 7,659,019, the complete disclosure of which is hereby incorporated by reference.

Product hydrogen stream 14 may be utilized for any desired purpose, such as to produce an electrical output in fuel cell stack 40. This optionally may include storing product hydrogen stream 14 for later use, such as by storing at least a portion of product hydrogen stream 14 in hydrogen storage device 90, typically after compressing the portion of product hydrogen stream 14 to be stored, and/or supplying product hydrogen stream 14 to a hydrogen-consuming assembly 43, such as to fuel cell system 42. Hydrogen storage device 90 may include any suitable structure configured to store or otherwise contain a portion of product hydrogen stream 14. Examples of hydrogen storage devices 90 include any suitable tank, pressure tank, and/or a hydride storage bed.

As mentioned, hydrogen-producing fuel processing systems 10 may be included in or define a hydrogen-producing portion of a hydrogen-producing and consuming assembly 12. As shown in FIG. 1, hydrogen-producing and consuming assembly 12 also may include a hydrogen-consuming assembly 43 that is configured receive product hydrogen stream 14 from fuel processing system 10 and consume, or otherwise utilize, product hydrogen stream 14. As an example, hydrogen-consuming assembly 43 may include a fuel cell system 42 that is configured to generate an electrical power output 41 from product hydrogen stream 14. It is within the scope of the present disclosure that hydrogen-producing fuel processing system 10 may include any suitable power management devices, such as a DC/DC converter, a rectifier, and the like, such as to rectify, increase or decrease the voltage of, or otherwise manage or convert power output 41.

Electrical power output 41 from fuel cell system 42 may be stored for later use, such as through the use of an energy storage device 50, and/or utilized to satisfy an electrical load applied by energy-consuming device 46. Energy storage device 50 may include any suitable structure adapted to store at least a portion of the electrical output from fuel cell system 42. Examples of energy storage devices 50 according to the present disclosure include any suitable battery, capacitor, ultracapacitor, supercapacitor, and/or flywheel.

It is within the scope of the present disclosure that energy-consuming device 46 optionally may be in electrical communication with a primary power source 52, which also may provide primary power to the hydrogen-producing fuel cell system. When energy-consuming device 46 is in electrical communication with a primary power source, hydrogen-producing and consuming assembly 12 may operate as an auxiliary and/or backup power system 56 adapted to satisfy the load applied by energy-consuming device 46 when primary power source 52 is unable to satisfy at least a portion of the applied load. Primary power source 52 includes any suitable structure adapted to supply a primary power source electrical output 54 to satisfy an applied load from energy-consuming device 46. Examples of primary power sources include an electrical utility grid, a hydroelectric power source, a solar power source, a wind-powered power source, another fuel cell system, and/or an energy storage device or system. Some primary power sources may include an energy storage device, or system, in combination with another source of electrical power, such as a hydroelectric power source, a solar power source, and/or a wind-powered power source.

An example of the primary power source being unable to satisfy at least a portion of the applied load includes the primary power source being unable to satisfy the entire applied load, such as when the magnitude of the applied load is greater than the magnitude of the electrical output available from the primary power source. Under these conditions, hydrogen-producing and consuming assembly 12 may supplement the electrical output from the primary power source and also may be referred to as a supplemental power source 60. Another example of the primary power source being unable to satisfy at least a portion of the applied load includes the primary power source being unable to satisfy any of the applied load, such as when there is no or only minimal electrical output from the primary power source. Under these conditions, hydrogen-producing and consuming assembly 12 may provide backup power for energy-consuming device 46 and also may be referred to as a backup power source 58. Yet another example of the primary power source being unable to satisfy at least a portion of the applied load includes the stability of the electrical output from the primary power source being below a threshold stability level. Under these conditions, hydrogen-producing and consuming assembly 12 may provide some or all of the power to energy-consuming device 46 and may be referred to as supplemental power source 60 and/or backup power source 58.

With continued reference to FIG. 1, feedstock stream(s) 16 may be delivered to hydrogen-producing region 19 of hydrogen-producing fuel processing system 10 via any suitable mechanism. While a single feedstock stream 16 is shown in solid lines in FIG. 1, it is within the scope of the disclosure that more than one feedstock stream 16 may be used and that these streams may contain the same or different feedstocks. When feedstock stream 16 contains two or more components, such as carbon-containing feedstock 18 and water 17, the components may be delivered in the same or different feedstock streams. For example, when fuel processing system 10 is adapted to produce hydrogen gas from a carbon-containing feedstock and water, and optionally (at least until both streams are vaporized or otherwise gaseous), when they are not miscible with each other, these components are typically delivered in separate streams, such as shown in FIG. 1 by reference numerals 17 and 18 pointing to different feedstock streams. When carbon-containing feedstock 18 is miscible with water, carbon-containing feedstock 18 may be delivered with the water component of feedstock stream 16, such as shown in FIG. 1 by reference numerals 17 and 18 pointing to the same feedstock stream 16. For example, when the hydrogen-producing region 19 receives a feedstock stream containing water and a water-soluble alcohol, such as methanol, these components may be premixed and delivered as a single stream. When hydrogen-producing region 19 receives a gaseous feedstock stream, the gaseous feedstock stream may be delivered to hydrogen-producing region 19 together with one or more of the liquid feedstock streams, or as a separate feedstock stream, such as shown in FIG. 1.

In FIG. 1, feedstock stream(s) 16 are shown being delivered to hydrogen-producing region 19 by feedstock delivery system 22, which schematically represents any suitable mechanism, device, or combination thereof for selectively delivering feedstock stream(s) 16 to the hydrogen-producing region 19. For example, feedstock delivery system 22 may include one or more pumps that are adapted to deliver the components of feedstock stream(s) 16 from one or more supplies. Additionally or alternatively, feedstock delivery system 22 may include a valve assembly adapted to regulate the flow of the components of feedstock stream(s) 16 from a pressurized supply. This supply may be located external of fuel processing system 10, or they may be contained within or adjacent the fuel processing system 10. When feedstock stream(s) 16 are delivered to hydrogen-producing region 19 in more than one stream, the streams may be delivered by the same or separate feedstock delivery systems 22. Examples of feedstock delivery systems are disclosed in U.S. Pat. Nos. 7,601,302, 6,375,906, 7,135,048, and 6,890,672, and in U.S. Patent Application Publication Nos. 2009/0155642 and 2019/0273275, the complete disclosures of which are hereby incorporated by reference.

Hydrogen-producing region 19 may utilize any suitable process or mechanism to produce hydrogen gas from feedstock stream(s) 16 and may be contained within or external to heated containment structure 70. Examples of suitable mechanisms by which hydrogen-producing region 19 may produce hydrogen gas from feedstock stream(s) 16 include steam reforming, autothermal reforming, and partial oxidation reforming. In some examples, hydrogen-producing region 19 includes one or more reforming catalysts 23 that are configured to produce hydrogen gas from feedstock stream(s) 16 containing a carbon-containing feedstock stream 18 and water stream 17. Examples of suitable carbon-containing feedstocks 18 include at least one hydrocarbon or alcohol. Examples of suitable hydrocarbons include methane, propane, natural gas, diesel, kerosene, gasoline, and the like. Examples of suitable alcohols include methanol, ethanol, various propanols, and polyols, such as ethylene glycol and propylene glycol. Other suitable mechanisms for producing hydrogen gas from feedstock stream(s) 16 include ammonia decomposition, electrolysis of water, and water-gas-shift reactions. Illustrative, nonexclusive examples of suitable hydrogen-producing regions and/or mechanisms are disclosed in U.S. Pat. Nos. 6,221,117, 5,997,594, 5,861,137, and in U.S. Patent Application Publication Nos. 2001/0045061, 2003/0192251, and 2003/0223926, the complete disclosures of which are hereby incorporated by reference.

Steam reforming is an example of a hydrogen-producing mechanism that may be employed in hydrogen-producing region 19, in which feedstock stream 16 comprises water 17 and carbon-containing feedstock 18. In a steam reforming process, hydrogen-producing region 19 contains a suitable steam reforming catalyst 23, as indicated in dashed lines in FIG. 1. In such examples, the hydrogen-producing fuel processing system may be referred to as a steam reformer, and hydrogen-producing region 19 may be referred to as a reforming region, and mixed gas stream 20 may be referred to as a reformate stream. As a more specific example, hydrogen-producing region 19 may employ a methanol steam reforming reaction, and/or may be referred to as a methanol reforming region, and may include a methanol steam reforming catalyst 23 that is configured to produce, from methanol and water, a mixed gas stream 20 containing hydrogen as the majority component.

When hydrogen-producing region 19 includes reforming catalyst 23, reforming catalyst 23 may be non-pyrophoric, such that reforming catalyst 23 may be exposed to, or contacted with, air or oxygen without combusting and/or being deactivated. Examples of suitable steam reforming catalysts are disclosed in U.S. Pat. No. 7,128,769, the complete disclosure of which is hereby incorporated by reference. Additional examples of non-pyrophoric reforming catalysts that may be utilized in hydrogen-producing region 19 include a reforming catalyst sold under the trade name of KMA by Clariant and/or a reforming catalyst that contains zinc oxide supported on calcium aluminate.

Steam reformers typically operate at temperatures in the range of 200° C. (degrees Celsius) and 900° C., and at pressures in the range of 50 psi (pounds per square inch) and 300 psi, although temperatures and pressures outside of this range are within the scope of the disclosure. When the carbon-containing feedstock 18 is methanol, the hydrogen-producing steam reforming reaction, or the hydrogen-producing region 19, will typically operate in a hydrogen-producing temperature range of approximately 200-500° C. Illustrative subsets of this range include 275-375° C., 300-400° C., 350-450° C., 375-425° C., and 375-400° C. When the carbon-containing feedstock is a hydrocarbon, ethanol, or a similar alcohol, a hydrogen-producing temperature range of approximately 400-900° C. will typically be used for the steam reforming reaction, or by hydrogen-producing region 19. Illustrative subsets of this range include 750-850° C., 725-825° C., 650-750° C., 700-800° C., 700-900° C., 500-800° C., 400-600° C., and 600-800° C. It is within the scope of the present disclosure that hydrogen-producing region 19 may include two or more zones, or portions, each of which may be operated at the same or at different temperatures. For example, when the carbon-containing feedstock 18 includes a liquid hydrocarbon, in some embodiments it may be desirable to include two different hydrogen-producing portions, with one operating at a lower temperature than the other to provide a pre-reforming region. In such an embodiment, fuel processing system 10 may alternatively be described as including two or more hydrogen-producing regions 19.

Hydrogen-producing fuel processing system 10 also may include a mixed gas filter 30 that is positioned downstream of hydrogen-producing region 19 and upstream of hydrogen-separation membrane module 80, such that mixed gas stream 20 is passed through mixed gas filter 30 when mixed gas stream 20 is transferred from hydrogen-producing region 19 to hydrogen-separation membrane module 80. Mixed gas filter 30 may be configured to filter mixed gas stream 20 to remove or lower the concentration of selected impurities that may be contained within mixed gas stream 20, and which may be detrimental to operation of hydrogen-separation membrane module 80. For example, mixed gas filter 30 may be configured to remove one or more of particulate, sols, soot, and/or ash that may be present in mixed gas stream 20 when mixed gas stream 20 is released from hydrogen-producing region 19.

As discussed herein, hydrogen-separation membrane module 80 is configured to separate mixed gas stream 20 into product hydrogen stream 14 and byproduct stream 68. Hydrogen-separation membrane module 80 includes at least one hydrogen-selective membrane 84 that is configured to separate mixed gas stream 20 into product hydrogen stream 14 and byproduct stream 68. Examples of hydrogen-separation membrane modules 80, as well as components thereof, and/or methods for operating the same that may be utilized with and/or included in hydrogen-producing fuel processing systems 10 according to the present disclosure are described in U.S. Pat. Nos. 6,569,227, 6,723,156, and 10,476,093, and in PCT Patent Application Publication No. WO 2016/178849, the complete disclosures of which are hereby incorporated by reference.

Hydrogen-selective membrane(s) 84 separate, divide, or partition hydrogen-separation membrane module 80 into a mixed gas region 88 and a permeate region 86. Mixed gas stream 20 is received within mixed gas region 88, and hydrogen gas contained within mixed gas stream 20 diffuses through hydrogen-selective membrane(s) 84 to permeate region 86, where it is removed from hydrogen-separation membrane module 80 as product hydrogen stream 14. When the separation assembly receives mixed gas stream 20 produced by a steam reformer or other hydrogen-producing regions 19 that utilize a reforming reaction to produce the mixed gas stream, mixed gas region 88 may be referred to as the reformate region.

Hydrogen-selective membrane(s) 84 are formed from any suitable material that enables diffusion of hydrogen gas therethrough, while restricting the diffusion of the other materials contained within mixed gas stream 20. Examples of hydrogen-selective membranes 84 according to the present disclosure include membranes constructed of one or more of palladium, palladium alloys, palladium alloys containing copper, palladium alloys containing silver, and palladium alloys containing gold, as well as other metallic membranes constructed of substantially pure or alloyed metals. Examples of suitable hydrogen-selective membrane compositions containing an alloy of palladium and copper include alloys with 15-45 wt % copper, including alloys with 15-25 wt % copper, 35-45 wt % copper, 20 wt % (or approximately 20 wt %) copper, or 40 wt % (or approximately 40 wt %) copper. Examples of suitable hydrogen-selective membranes, membrane compositions, and separation assemblies containing the same are disclosed in U.S. Pat. Nos. 6,537,352 and 10,476,093 and in U.S. Patent Application Publication No. 2008/0210088, the complete disclosures of which are hereby incorporated by reference.

Each hydrogen-selective membrane 84 may be described as having a mixed gas face 83 and an opposed permeate face 82, in which mixed gas face 83 is positioned in, or faces, mixed gas region 88 of hydrogen-separation membrane module 80, and in which permeate face 82 is positioned in, or faces, permeate region 86 of hydrogen-separation membrane module 80. In other words, mixed gas face 83 may be described as the portion of hydrogen-selective membrane 84 that contacts mixed gas stream 20, and permeate face 82 may be described as the portion of hydrogen-selective membrane 84 that contacts product hydrogen stream 14.

Each hydrogen-selective membrane 84 also may be constructed to possess any suitable thickness, which may be measured between mixed gas face 83 and permeate face 82. In particular, a diffusion rate of hydrogen gas through the hydrogen-selective membrane(s) and/or the hydrogen permeability of hydrogen-selective membrane(s) 84 may be proportional to a thickness of, or a distance that the hydrogen gas must diffuse through, the hydrogen-selective membrane. As such, it may be desirable to decrease a thickness of each hydrogen-selective membrane and/or to utilize hydrogen-selective membranes that are very thin, with many conventional hydrogen-selective membranes generally having a thickness of 15-25 microns. As examples, each hydrogen-selective membrane 84 may possess a thickness of at most 25 microns, at most 20 microns, at most 15 microns, at most 12 microns, at most 10 microns, at most 8 microns, at most 5 microns, at least 3 microns, at least 6 microns, at least 8 microns, at least 10 microns, and/or at least 12 microns.

In some examples, hydrogen-separation membrane module 80 comprises a plurality of hydrogen-selective membranes 84. When hydrogen-separation membrane module 80 comprises a plurality of hydrogen-selective membranes 84, hydrogen-selective membranes 84 may be arranged in membrane pairs. Each membrane pair includes a first hydrogen-selective membrane and a second hydrogen selective membrane, with the first and second hydrogen-selective membranes arranged with the permeate faces thereof facing one another and with a portion of permeate region 86 being formed therebetween. Hydrogen-separation membrane module 80 may include a plurality of membrane pairs, such as a plurality of membrane pairs that are arranged in a stack, with the membrane pairs disposed or positioned adjacent to one another with suitable support structures, gaskets, and the like.

Hydrogen-separation membrane module 80 may be described as operating in a hydrogen-producing regime when hydrogen-separation membrane module 80 receives mixed gas stream 20 and separates mixed gas stream 20 into product hydrogen stream 14 and byproduct stream 68. When operating in the hydrogen-producing regime, hydrogen-separation membrane module 80 may be maintained at a hydrogen-separation temperature that may be a temperature or temperature range at which hydrogen-separation membrane module 80 is optimized for separating mixed gas stream 20 into product hydrogen stream 14 and byproduct stream 68. Particularly, the hydrogen permeability of hydrogen-selective membrane(s) 84 may increase with temperature up to a certain temperature or temperature range, and temperatures beyond this range may be detrimental to hydrogen-selective membrane(s) 84, and/or operation of hydrogen-separation membrane module 80. The hydrogen-separation temperature may be a thermally buffered temperature or temperature range. Examples of the hydrogen-separation temperature include temperatures that are at least 100° C., including temperatures of greater than 175° C., 200° C., 250° C., 275° C., 300° C., 350° C., 400° C., and 450° C., as well as temperatures in the range of 100-500° C., including temperatures in the range of 100-450° C., 150-425° C., 200-400° C., 225-350° C., 275-450° C., 100-275° C., 140-240° C., 350-450° C., and 300-500° C., though temperatures outside of these ranges are also within the scope of the present disclosure. As a specific example, for hydrogen-selective membranes containing an alloy of palladium and approximately 35-45% copper, suitable hydrogen-separation temperatures may include temperatures in the range of 300-450° C.

In some examples, hydrogen-producing fuel processing systems 10 comprise a polishing region 32 that receives product hydrogen stream 14 from hydrogen-separation membrane module 80 and is configured to further purify, remove, reduce, and/or chemically react with selected impurities that may be present within product hydrogen stream 14. Examples of devices that may be utilized within polishing region 32 include water-shift reactors, and other devices that convert carbon monoxide to carbon dioxide, as well as methanation catalysts that convert carbon monoxide and hydrogen to methane and water. For example, when product hydrogen stream 14 is intended for use in a fuel cell system 42 that includes a proton exchange membrane (PEM) or another device that will be damaged if product hydrogen stream 14 includes more than determined concentrations of carbon monoxide or carbon dioxide, polishing region 32 may include at least one methanation catalyst bed.

As shown in FIG. 1, hydrogen-producing fuel processing system 10 may include a buffer tank 78 that is configured to receive product hydrogen stream 14 from hydrogen-separation membrane module 80, or optionally polishing region 32, and store a volume of product hydrogen stream 14, such as prior to supply of product hydrogen stream 14 to hydrogen-consuming assembly 43. Buffer tank 78 may increase a stability in a pressure of product hydrogen stream 14 that is provided to hydrogen-consuming assembly 43 and/or may decrease a potential for pressure variation in the pressure of product hydrogen stream 14 that is supplied to hydrogen-consuming assembly 43, such as fuel cell stack 40.

When hydrogen-producing fuel processing system 10 is included in hydrogen-producing and consuming assembly 12, product hydrogen stream 14 produced by fuel processing system 10 may be delivered to a fuel cell stack 40 of fuel cell system 42. A fuel cell stack is a device that produces an electrical potential from a source of protons, such as hydrogen gas, and an oxidant, such as oxygen gas. Accordingly, fuel cell stack 40 may be configured to receive at least a portion of product hydrogen stream 14 and a stream of (or containing) oxygen gas (which is typically delivered as an air stream), and to produce an electric current therefrom. This is schematically illustrated in FIG. 1, in which an air (or oxygen-containing) stream is indicated at 49, a fuel cell stack is indicated at 40, and an electric current, or power output, which is produced by the fuel cell stack is schematically illustrated at 41. Fuel cell stack 40 contains at least one, and typically multiple, fuel cells 44 that are adapted to produce an electric current from the oxidant and the portion of the product hydrogen stream 14 delivered thereto. The fuel cells typically are joined together between common end plates 48, which contain fluid delivery/removal conduits, although this construction is not required to all embodiments. Examples of suitable fuel cells 44 include proton exchange membrane (PEM) fuel cells, high temperature proton exchange membrane fuel cells, low temperature proton exchange membrane fuel cells, polybenzimidazole (BPI) membrane fuel cells, alkaline fuel cells, and phosphoric acid fuel cells, though other types of fuel cells also are within the scope of the present disclosure.

The electric current, or power output, 41 produced by fuel cell stack 40 may be used to satisfy the energy demands, or applied load, of at least one associated energy-consuming device 46. Examples of energy-consuming devices 46 include tools, lights or lighting assemblies, appliances (such as household or other appliances), households or other dwellings, offices or other commercial establishments, computers, signaling or communication equipment, telecommunication equipment, medical equipment, etc. Similarly, fuel cell stack 40 may be used to satisfy the power requirements of fuel cell system 42, which may be referred to as the balance-of-plant power requirements of the fuel cell system. Energy-consuming device 46 is schematically illustrated in FIG. 1 and is meant to represent one or more devices, or collection of devices, that are adapted to draw electric current from, or apply an electrical load to, fuel cell system 42.

With continued reference to FIG. 1, the portion of mixed gas stream 20 that does not diffuse through hydrogen-selective membrane(s) 84 may include the impurities (other gasses) contained within mixed gas stream 20, as well as a portion of the hydrogen gas contained therein, and may be discharged from hydrogen-separation membrane module 80 as byproduct stream 68. Byproduct stream 68 may be disposed of in any suitable manner, including being discharged to the environment external to hydrogen-producing fuel processing system 10, chemically treated and/or reacted prior to being discharged, supplied as a fuel stream to burner assembly 92, utilized as a reactant stream for another chemical process, and/or stored for later use.

As shown in FIG. 1, fuel processing system 10 may include a byproduct stream conduit 62 that is configured to direct byproduct stream 68 from hydrogen-separation membrane module 80 to another portion of fuel processing system 10, such as burner assembly 92 and/or externally from fuel processing system 10. One or more oxygen-isolation devices 150 may be located on the byproduct stream conduit 62 that may be configured to decrease the potential for oxygen gas and/or other contaminants/compositions to diffuse into hydrogen-separation membrane module 80 through byproduct stream conduit 62, such as while fuel processing system 10 is operated in an off regime or a primed regime, which are discussed in more detail herein. Examples of oxygen-isolation devices 150 may include any suitable structure adapted to impede the flow of oxygen gas to hydrogen-separation membrane module 80 and may include any suitable valve and/or sorbent material, or sorbent medium, that is configured to sorb oxygen gas. Examples of suitable sorbents for at least oxygen gas include cerium and/or cerium compounds, low temperature shift catalysts, and catalysts and compounds that contain copper and zinc oxides.

Hydrogen-producing fuel processing system 10 may include a heated containment structure 70 that defines an internal compartment which may contain hydrogen-separation membrane module 80, heating assembly 91, hydrogen-producing region 19, and/or a portion of feedstock delivery system 22, as well as any suitable valves, conduits, and/or piping associated with the above components. It also is within the scope of the present disclosure that heated containment structure 70 may include additional system components. Any components contained within heated containment structure 70 may be maintained at substantially the same temperature, or may be maintained at different temperatures. This may be accomplished in any suitable manner, such as through the use of separate heating assemblies 91 for the various components contained within heated containment structure 70, the distance of a particular component from a heating assembly, internal structure such as baffles, supports, partitions, and/or the like to direct and/or control heat flow from the heating assembly, and/or the use of a plurality of heated containment structures, each with internal compartments that are maintained at separate temperatures and/or ranges of temperatures. It also is within the scope of the present disclosure that heated containment structure 70 may include insulation that may decrease the rate of heat transfer between the internal compartment of heated containment structure 70 and the environment and/or control the flow of heat among the components contained within the internal compartment.

Heating assembly 91 may utilize any suitable structure to supply heat to the internal compartment of heated containment structure 70, to the components contained therein, and/or to various components of fuel processing system 10. This may include a burner assembly 92 and/or an electrical heating assembly 93. When heating assembly 91 includes burner assembly 92, the fuel for burner assembly 92 may be provided by any suitable source. Examples of fuels for burner assembly 92 include byproduct stream 68, as discussed in more detail herein, product hydrogen stream 14, mixed gas stream 20, feedstock stream 16, carbon-containing feedstock 18, or any other suitable combustible fuel source. Examples of sources of electrical energy for electrical heating assembly 93 include energy supplied by energy storage device 50, fuel cell stack 40, and/or primary power source 52.

As shown in FIG. 1, hydrogen-producing fuel processing system 10 includes an oxidant delivery system 200 that is configured to deliver oxidant-containing stream 212 to hydrogen-separation membrane module 80. More specifically, oxidant delivery system 200 is configured to selectively expose at least a portion of hydrogen-selective membrane(s) 84 to oxidant-containing stream 212 to increase the hydrogen permeance of hydrogen-selective membrane(s) 84. As discussed herein, oxidant delivery system 200 also may be described as being configured to improve, restore, and/or recover the hydrogen permeance of hydrogen-separation membrane module 80.

Hydrogen-producing fuel processing system 10 may be configured to produce product hydrogen stream 14 with a desired flowrate and/or within a particular range of flow rates. For example, hydrogen-consuming assembly 43 and/or fuel cell system 42 may require product hydrogen stream 14 to be delivered with at least a threshold minimum flow rate, thus requiring fuel processing system 10 to supply product hydrogen stream 14 with at least this minimum flow rate. Among other factors, the flow rate of product hydrogen stream 14 may be influenced by, determined by, or responsive to the hydrogen permeance of hydrogen-separation membrane module 80 and/or the hydrogen permeance of hydrogen-selective membrane(s) 84. Additionally, the hydrogen permeability of hydrogen-selective membrane(s) 84 may determine the flow rate of product hydrogen stream 14. With this in mind, hydrogen-producing fuel processing system 10 may be configured for hydrogen-separation membrane module 80, and/or hydrogen-selective membrane(s) 84, to operate with a desired hydrogen permeance or within a desired range of hydrogen permeance, and/or for hydrogen-selective membrane(s) 84 to maintain a desired hydrogen permeability, such that product hydrogen stream 14 is produced with the desired flow rate and/or within the desired range of flowrates.

Hydrogen-separation membrane module 80 may be contacted by, exposed to, or undergo permeance-decreasing factors that may diminish, reduce, or negatively impact the hydrogen permeance of hydrogen-separation membrane module 80, the hydrogen permeance of hydrogen-selective membrane(s) 84, and/or the hydrogen permeability of hydrogen-selective membranes 84, such as to below the desired hydrogen permeance, hydrogen permeability, or ranges thereof. Some permeance-decreasing factors may be present during, or as a result of, manufacture of hydrogen-separation membrane module 80 and/or before operation of fuel processing system 10, and some permeance-decreasing factors only may be present during operation of fuel processing system 10, and/or only may result from operation of fuel processing system 10. Stated differently, some permeance-decreasing factors only may be present during and/or only may result from operation of hydrogen-separation membrane module 80 in a hydrogen-producing regime. As discussed in more detail herein, the permeance-decreasing factors may reduce hydrogen permeance or hydrogen permeability in a variety of ways, such as by membrane poisoning, non-ideal microstructural changes, and active surface area reduction.

As examples, the permeance-decreasing factors may include permeance-decreasing contaminants or compositions that contact, may chemically react with, or otherwise physically interact with, hydrogen-selective membrane(s) 84. As examples, the permeance-decreasing contaminants may include one or more of physically bound contaminants, chemically bound contaminants, chemically reacted contaminants, and interstitial contaminants. These permeance-decreasing contaminants or compositions often will be gasses prior to interacting with hydrogen-selective membrane(s) 84, but they may take other forms such as, for example, sodium chloride or other salts that may decrease the hydrogen permeance of hydrogen-selective membrane(s) 84. For example, permeance-decreasing contaminants may include chemical species, such as carbon monoxide and/or hydrogen sulfide, that sorb to hydrogen-selective membrane(s) 84. As used herein, the term "sorb" means binding and/or retaining the composition, contaminant, or other species by any process, including adsorption, absorption, chemical bonding, or a combination thereof, among others. Accordingly, the term "desorb," as used herein, means unbinding or freeing of sorbed species. As another example, the permeance-decreasing contaminants may include chemical species that have reacted with hydrogen-selective membrane(s) 84 to form compositions with or regions of the membrane that have reduced or diminished hydrogen permeability. For example, metal carbide formation, such as $Pd_xC_y$ (palladium carbide) or carbon deposition may occur on the surface of, and/or within hydrogen-selective membrane(s) 84, which may be caused by, for example, catalytic decomposition of carbon monoxide present in mixed gas stream 20 on hydrogen-selective membrane(s) 84.

The permeance-decreasing factors also may include permeance-decreasing microstructural changes that may occur in hydrogen-selective membrane(s) 84 and that may be caused by continued operation of hydrogen-separation membrane module 80 in the hydrogen-producing regime. For example, continued exposure of hydrogen-selective membrane(s) 84 to hydrogen flux and/or elevated temperature during operation of hydrogen-separation membrane module 80 in the hydrogen-producing regime may cause alloy components within the hydrogen-selective membrane(s) 84 to migrate and/or desegregate to form non-ideal phases that have lower hydrogen permeability. As discussed herein, an "elevated temperature" may include any temperature that is above ambient temperature, for example at least 50° C. and/or at least 100° C., and may include the hydrogen-producing and/or hydrogen-separation temperatures described and/or incorporated herein.

The decrease in hydrogen permeance or hydrogen permeability caused by the permeance-decreasing factors may be reversible, treatable, or reparable, by exposing at least a portion of hydrogen-selective membrane(s) 84 to the oxidizing environment of oxidant-containing stream 212. Stated differently, oxidant delivery system 200 may selectively deliver oxidant-containing stream 212 to hydrogen-separation membrane module 80 to treat, reverse, or repair the decrease in permeance or permeability caused by any of these permeance-decreasing factors and/or combinations thereof. Stated yet another way, oxidant delivery system 200 may be described as being configured to mitigate at least some, or all, of the permeance-decreasing factors. In particular, oxidant delivery system 200 may be configured to remove or mitigate permeance-decreasing factors that are present before operation of fuel processing system 10. Additionally or alternatively, oxidant delivery system 200 may be configured to remove or mitigate the permeance-decreasing factors that only are present during, or caused by, operation of fuel processing system 10 and/or operation of hydrogen-separation membrane module 80 in the hydrogen-producing regime.

As examples, oxidant-containing stream 212 supplied by oxidant delivery system 200 may be configured to remove one or more of chemically bound contaminants, physically bound contaminants, chemically reacted contaminants, and interstitial contaminants from hydrogen-selective membrane(s) 84. As more specific examples, oxidant-containing stream 212 may be configured to selectively desorb permeance-decreasing contaminants that are sorbed to hydrogen-selective membrane(s) 84, such as hydrogen sulfide and/or carbon monoxide. More specifically, oxidant-containing stream 212 may selectively oxidize the sorbed permeance-decreasing contaminants to desorb the permeance-decreasing contaminants. As another example, oxidant-containing stream 212 may selectively oxidize carbon deposits or metal carbides present on the surface of, or within, hydrogen-selective membrane(s) 84 to release, desorb, or remove these permeance-decreasing contaminants.

Oxidant-containing stream 212 also may be configured to facilitate microstructural changes in hydrogen-selective membrane(s) 84 that increase the hydrogen permeance or hydrogen permeability thereof and/or that treat, remove, or reverse permeance-decreasing microstructural changes in hydrogen-selective membrane(s) 84, which may have occurred during operation of hydrogen-separation membrane module 80 in the hydrogen-producing regime. As an example, oxidant-containing stream 212 may be configured to facilitate surface roughening in hydrogen-selective membrane(s) 84 to increase an active surface area of hydrogen-selective membrane(s) 84, such as to increase the hydrogen permeance of hydrogen-selective membrane(s) 84. As another example, oxidant-containing stream 212 may be configured to facilitate idealized alloy segregation and/or reverse permeance-decreasing alloy desegregation and/or migration to improve the hydrogen permeability of hydrogen-selective membrane(s) 84.

Stated in more general terms, oxidant delivery system 200 and/or oxidant-containing stream 212 may be described as being configured to increase the hydrogen permeance of hydrogen-separation membrane module 80 by increasing the surface area of hydrogen-selective membrane(s) 84, such as by removing surface-sorbed contaminants, by facilitating surface roughening, and/or by facilitating permeance-increasing microstructural changes. Additionally or alternatively, oxidant delivery system 200 and/or oxidant-containing stream 212 may be described as being configured to increase hydrogen permeance of hydrogen-separation membrane module 80 by chemically "cleaning" hydrogen-selective membrane(s) 84, such as by oxidizing, desorbing, and/or removing the permeance-decreasing contaminants.

Oxidant-containing stream 212 includes at least one oxidant 214 that may be delivered to hydrogen-separation membrane module 80 in any suitable composition, phase, and/or under any suitable set of conditions. The particular type(s) of oxidant 214 and composition of oxidant-containing stream 212, may be selected based upon factors such as the conditions under which oxidant-containing stream 212 is delivered to and/or exposed to hydrogen-selective membrane(s) 84, the particular type of hydrogen-selective membrane(s) 84, and/or the type of permeance-decreasing factors being treated. As examples, oxidant(s) 214 may include one or more of oxygen gas and/or allotropes and/or excited states thereof, such as ozone and/or singlet oxygen, a peroxide, and/or hydrogen peroxide. Oxidant-containing stream 212 also may include a carrier fluid, such as a gas, that may be utilized to disperse and/or dilute oxidant(s) 214 and/or may be utilized to deliver the at least one oxidant to hydrogen-separation membrane module 80, such as at a desired concentration or partial pressure. As examples, oxidant-containing stream 212 may include a gaseous mixture containing oxidant(s) 214 and/or oxidant(s) 214 dispersed as a sol in a carrier gas. Additionally or alternatively, oxidant-containing stream 212 may be at least substantially or completely composed of oxidant 214.

In some examples, oxidant-containing stream 212 comprises air and/or comprises an atmospheric composition of gasses, in which oxidant 214 is oxygen gas. More specifically, the atmospheric composition of gasses may include approximately 21% oxygen gas, and non-oxidizing gasses including approximately 78% nitrogen gas, 0-5% water vapor, and smaller amounts of other non-oxidizing gasses. Depending on the conditions under which oxidant-containing stream 212 is delivered to and/or exposed to hydrogen-selective membrane(s) 84, as well as the particular type of hydrogen-selective membrane(s) 84, and/or the type of permeance-decreasing factors being treated, it may be desirable for oxidant-containing stream 212 to be enriched in oxygen gas relative to the atmospheric composition or it may be desirable for oxidant-containing stream to be depleted in oxygen gas relative to the atmospheric composition. For example, oxidant delivery system 200 may be configured to deliver an oxidant-containing stream that is depleted in oxygen gas relative to the atmospheric composition by diluting air with one or more non-oxidizing gas, such as carbon dioxide, combusted gasses from burner assembly 92, and/or nitrogen gas. As another example, oxidant delivery system 200 may be configured to deliver an oxidant-containing stream that is enriched in oxygen gas relative to the atmospheric composition by adding oxygen gas to air.

Oxidant delivery system 200 may deliver oxidant(s) 214 and/or oxidant-containing stream 212 from any suitable source or feedstock. As shown in FIG. 1, oxidant delivery system 200 may include one or more oxidant storage devices 220, such as one or more tanks and/or one or more pressure tanks, that are configured to store oxidant(s) 214 and/or the composition of oxidant-containing stream 212. As an example, oxidant storage device(s) 220 may store compressed air that may be utilized as at least a portion of oxidant-containing stream 212. Additionally or alternatively, oxidant-storage device(s) 220 may store compressed oxygen gas, which may be utilized as at least a portion of oxidant-containing stream 212. As another example, oxidant delivery system 200 may include an air inlet 210 that may be utilized by oxidant delivery system 200 to render air, such as externally from fuel processing system 10 and/or heated containment structure 70, to be utilized as at least a portion of oxidant-containing stream 212.

With continued reference to FIG. 1, oxidant delivery system 200 may be configured to deliver oxidant-containing stream 212 to any suitable portion of hydrogen-separation membrane module 80. In particular, oxidant delivery system 200 may be configured to supply oxidant-containing gas stream 212 to mixed gas region 88 of hydrogen-separation membrane module 80. Stated another way, oxidant delivery system 200 may be configured to selectively expose mixed gas face 83 of hydrogen-selective membrane(s) 84 to oxidant-containing stream 212. When hydrogen-separation membrane module 80 comprises a plurality of hydrogen-selective membranes 84, oxidant delivery system 200 may be configured to selectively expose at least some of and/or all of the hydrogen-selective membranes 84 to oxidant-containing stream 212.

Oxidant delivery system 200 may be configured to deliver oxidant-containing stream 212 to hydrogen-separation membrane module 80 in any suitable manner. As examples, oxidant delivery system 200 may include one or more oxidant-containing stream conduits 216 and/or one or more oxidant stream inlets 218 that oxidant delivery system 200 may utilize to supply or direct oxidant-containing stream 212 to hydrogen-separation membrane module 80. Oxidant stream inlets 218 may include any suitable device, such as a valve, or a three-way valve, that may permit oxidant delivery system 200 to selectively deliver, and selectively cease delivery of, oxidant-containing stream 212. Oxidant delivery system 200 may be configured to deliver oxidant-containing stream 212 directly to hydrogen-separation membrane module 80. Additionally or alternatively, oxidant delivery system 200 may deliver or direct oxidant-containing stream 212 to hydrogen-separation membrane module 80 via one or more conduits, valves, and/or piping that operably interconnect other components of hydrogen-producing fuel processing system 10 to hydrogen-separation membrane module 80.

For example, oxidant delivery system 200 may be configured to deliver oxidant-containing stream 212 directly to mixed gas region 88 of hydrogen-separation membrane module 80, such as via one or more oxidant stream inlets 218 positioned thereon. Additionally or alternatively, oxidant delivery system 200 may include an oxidant stream inlet 218 that is interconnected or associated with a mixed gas stream inlet 81 of hydrogen-separation membrane module 80. Oxidant-containing stream 212 may be supplied to mixed gas region 88 via oxidant stream inlet 218. As another example, oxidant delivery system 200 may include an oxidant stream inlet 218 that is interconnected or associated with a byproduct stream outlet 85 through which oxidant-containing stream 212 may be delivered to mixed gas region 88.

Oxidant delivery system 200 may be configured to deliver oxidant-containing stream 212 via any suitable path through hydrogen-producing fuel processing system 10. In particular, oxidant delivery system 200 may be configured to deliver oxidant-containing stream 212 to hydrogen-separation membrane module 80 and/or flow oxidant-containing stream 212 through hydrogen-separation membrane module 80 in either or both of an upstream direction and a downstream direction. In the present disclosure, the downstream direction may refer to a direction, such as a direction of flow and/or a direction leading from one component to another, that coincides with the direction of hydrogen-producing flow in fuel processing system 10. For example, hydrogen-separation membrane module 80 may be described as being downstream of hydrogen-producing region 19, and either of product hydrogen stream 14 and byproduct stream 68 may be described as being downstream of hydrogen-separation membrane module 80. Accordingly, in the present disclosure, the upstream direction may refer to a direction that opposes the direction of the hydrogen-producing flow in fuel processing system 10, and the downstream direction may refer to a direction that is in the direction of the hydrogen-producing flow in fuel processing system 10.

As shown in FIG. 1, oxidant stream inlet(s) 218 may interconnect with any suitable portion of fuel processing system 10, such that oxidant delivery system 200 may introduce, feed or deliver oxidant-containing stream 212 therethrough. As shown in FIG. 1, oxidant delivery system 200 may include an oxidant stream inlet 218 that is positioned upstream of hydrogen-producing region 19 and may be interconnected with a fuel inlet port 21 of hydrogen-producing region 19. In this way, oxidant delivery system 200 may deliver oxidant-containing stream 212 through hydrogen-producing region 19, mixed gas stream conduit 64, and optionally mixed gas filter 30 to mixed gas stream inlet 81 of hydrogen-separation membrane module 80. Such a configuration advantageously may permit at least a portion of oxidant delivery system 200 to be positioned outside of heated containment structure 70, such that an existing, or a field-operating, fuel processing system 10 may be modified post-manufacturing or in the field to include and/or utilize oxidant delivery system 200. In some such examples, hydrogen-producing region 19 may utilize or include a reforming catalyst 23 that is non-pyrophoric, such that flowing oxidant-containing stream 212 over reforming catalyst 23 will not damage the reforming catalyst or hydrogen-producing region.

Additionally or alternatively, oxidant delivery system 200 may include one or more oxidant stream inlets 218 that are positioned downstream of hydrogen-producing region 19. As an example, oxidant delivery system 200 may include an oxidant stream inlet 218 positioned along mixed gas stream conduit 64, such as upstream of mixed gas filter 30. In this way, mixed gas filter 30 may be utilized to filter oxidant-containing stream 212 before it is delivered to hydrogen-separation membrane module 80. Such a configuration may be advantageous, particularly when oxidant-containing stream 212 includes air. As yet another example, oxidant delivery system 200 may include an oxidant stream inlet 218 that is positioned along byproduct stream conduit 62, such as upstream of oxygen-isolation device(s) 150. In such a configuration, oxidant delivery system 200 may be configured to flow oxidant-containing stream 212 in the upstream direction through hydrogen-separation membrane module 80. In such a configuration, oxidant delivery system 200 and/or oxidant stream inlet 218 may be configured to isolate oxygen-isolation device(s) 150 from oxidant-containing stream 212. Oxidant delivery system 200 also may utilize any suitable outlet to exhaust or expel oxidant-containing stream 212 from fuel processing system 10 after it has been flowed through hydrogen-separation membrane module 80. As examples, oxidant delivery system 200 may utilize burner assembly 92 as an outlet when oxidant-containing stream 212 is flowed in the downstream direction and/or oxidant delivery system 200 may utilize a three-way valve positioned upstream of hydrogen-separation membrane module 80 when oxidant-containing stream 212 is flowed in the upstream direction.

Oxidant delivery system 200 may be configured to deliver oxidant-containing stream 212 to hydrogen-separation membrane module 80 via any suitable mechanism. More specifically, oxidant delivery system 200 may be configured to actively deliver oxidant-containing stream 212 to hydrogen-separation membrane module 80 and/or oxidant delivery system 200 may be configured to passively deliver oxidant-containing stream 212 to hydrogen-separation membrane module 80. As shown in FIG. 1, oxidant delivery system 200 may include a fluid handler 160 that is configured to actively flow, blow, and/or pump oxidant-containing stream 212 to and/or through hydrogen-separation membrane module 80, such as mixed gas region 88 thereof. Examples of suitable fluid handlers 160 include one or more fans, one or more blowers, one or more compressors, and/or one or more pumps. When included, fluid handlers 160 may be positioned along any suitable region of fuel processing system 10, such as along or within the conduits and/or inlets discussed herein and/or along or within hydrogen-separation membrane module 80. Additionally or alternatively, oxidant delivery system 200 may be configured to utilize temperature cycling within hydrogen-separation membrane module 80 to passively flow oxidant-containing stream 212 to and/or through hydrogen-separation membrane module 80, such as mixed gas region 88 thereof.

Oxidant delivery system 200 may be configured to deliver oxidant-containing stream 212 to hydrogen-separation membrane module 80 for a predetermined duration of oxidant supply time, which may be selected based on various factors such as the number or type of hydrogen-selective membranes 84 within hydrogen-separation membrane module 80, the temperature of hydrogen-separation membrane module 80 when oxidant-containing stream 212 is delivered, and/or various operational parameters of fuel processing system 10 that are discussed in more detail herein. As examples, when oxidant delivery system 200 actively delivers oxidant-containing stream 212, the oxidant supply time may include at least one of at least 10 minutes, at least 20 minutes, at least 30 minutes, at least 40 minutes, at least 60 minutes, at most 120 minutes, at most 180 minutes, at most 240 minutes, and/or in the range of 60-120 minutes. When oxidant delivery system 200 passively delivers oxidant-containing stream 212, the oxidant supply time may include at least 60 minutes, at least 120 minutes, at least 180 minutes, at least 240 minutes, at least 480 minutes, at least 720 minutes, at least 1,440 minutes, at least 2,160 minutes, at least 2,880 minutes, at most 720 minutes, at most 1,440 minutes, at most 2,160 minutes, at most 2,880 minutes, at most 3,600 minutes, and/or at most 4,320 minutes. Oxidant delivery system 200 also may be configured to deliver oxidant-containing stream 212 to hydrogen-separation membrane module 80 with a predetermined oxidant-containing stream flow rate, and/or with a predetermined oxidant-containing stream pressure. As examples, when oxidant delivery system 200 actively delivers oxidant-containing stream 212, the oxidant-containing stream flow rate may include at least one of at least 0.1 standard liters per minute (SLPM), at least 0.5 SLPM, at least 1 SLPM, at least 1.5 SLPM, at least 1.8 SLPM, at least 2 SLPM, at most 3 SLPM, at most 5 SLPM, and/or in the range of 0.5-3 SLPM, and/or in the range of 1.5-2 SLPM. As more examples, when oxidant delivery system 200 passively delivers oxidant-containing stream 212, the oxidant-containing stream flow rate may include at least one of 0.0001 SLPM, at least 0.001 SLPM, at least 0.01 SLPM, at least 0.1 SLPM, at least 0.5 SLPM, and/or at most 1 SLPM. As examples, the oxidant-containing stream pressure may be less than, greater than, or equal to the atmospheric pressure surrounding fuel processing system 10.

As shown in FIG. 1 and discussed herein, hydrogen-producing fuel processing systems 10 according to the present disclosure may include a controller 100 that is configured to control the operation of at least a portion of hydrogen-producing fuel processing system 10. As an example, and as shown in dashed lines in FIG. 1, controller 100 may be configured to receive status signals 102 that are indicative of the operational status of the various components of hydrogen-producing fuel processing system 10, and controller 100 may generate control signals 104 to control the operation of the various components of hydrogen-producing fuel processing system 10 based at least in part on the value of the status signals, calculations internal to the controller, and/or a control scheme. Methods 500 that are schematically represented in the flowchart of FIG. 3 and discussed herein with reference to FIG. 3 provide examples of control schemes that controller 100 may utilize to control various components of hydrogen-producing fuel processing system 10. This control may be implemented manually by a user, through the use of an electronic controller, or through a combination of the two. The controller may include any suitable type and number of devices or mechanisms to implement and provide for the desired monitoring and/or control of the thermally buffered hydrogen-producing fuel processing system.

As examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into one or more systems or assemblies of hydrogen-producing fuel processing system 10 or be a separate, stand-alone computing device. The controller may be adapted or otherwise programmed or designed to control the operation of hydrogen-producing fuel processing system 10 in the plurality of operational regimes of the system, including the various components thereof. Examples of controllers 100 according to the present disclosure are described in U.S. Pat. Nos. 6,383,670, 6,495,277, 6,811,908, 6,835,481, 6,979,507, 7,208,241, and 7,390,587, as well as in U.S. Patent Application Publication Nos. 2005/0266284, 2005/0266285, 2006/0024540, 2006/0134473, and 2008/0176118, the complete disclosures of which are hereby incorporated by reference. As discussed in more detail herein, controller 100 may control the operation of at least a portion of hydrogen-producing fuel processing system 10 and/or hydrogen-producing and consuming assembly 12 based at least in part on the status of various components of hydrogen-producing fuel processing system 10 and/or calculations internal to the controller. Examples of status signals 102 may include controller 100 receiving status signals indicative of the operational state of the various components of hydrogen-producing fuel processing system 10, as well as the temperature of the components and/or the temperature, pressure, concentration, flow rate, and/or humidity of the streams contained therein. More specific examples include controller 100 receiving status signals 102 indicative of the hydrogen permeance of the hydrogen-selective membrane, the hydration level of the fuel cell stack, the electrical impedance of the fuel cell stack, the fuel cell stack current, the pressure within hydrogen-separation membrane module 80, the temperature of the components within heated containment structure 70, and/or the ability of primary power system 52 to satisfy the electrical load applied by energy-consuming device 46.

Examples of portions of hydrogen-producing fuel processing system 10 that may be controlled by controller 100 include any valve, fluid handler, pump, compressor, flow-regulating device, temperature-regulating device, electrical energy regulating device, pressure-regulating device, and the like. More specific examples include controller 100 controlling the flow rate of feedstock stream(s) 16, such as by controlling the operation of the various pumps, compressors, valves, and/or mass flow controllers included in feedstock delivery system 22; controller 100 controlling the temperature of heated containment structure 70 and/or the various components of fuel processing system 10, such as by controlling the supply of electrical energy to electrical heating assembly 93 and/or the flow rate of combustible fuel and/or oxidant to burner assembly 92; controller 100 controlling the temperature of hydrogen-producing region 19, hydrogen-separation membrane module 80, oxidant delivery system 200, and/or fuel cell stack 40; controller 100 controlling oxidant delivery system 200 such as by controlling oxidant stream inlets and/or fluid handler 160 to control the flow of oxidant-containing stream 212 to hydrogen-separation membrane module 80; controller 100 controlling the consumption of electrical power output 41 by energy-consuming device 46; controller 100 controlling the concentration of one or more materials contained within hydrogen-producing fuel processing system 10; controller 100 controlling the flow rate of the mixed gas stream 20, product hydrogen stream 14, oxidant-containing stream 212, and/or byproduct stream 68; controller 100 controlling the pressure within the hydrogen-separation membrane module 80; and/or controller 100 controlling the operation and/or operational state of the various components that comprise hydrogen-producing fuel processing system 10, such as feedstock delivery system 22, hydrogen-producing region 19, hydrogen-separation membrane module 80, and/or fuel cell stack 40.

Hydrogen-producing fuel processing systems 10 and/or hydrogen-producing and consuming assemblies 12 according to the present disclosure may include (i.e., be configured and/or controlled to be operated at, or in) a plurality of operational regimes. An example of an operational (or operating) regime is a "hydrogen-producing" regime, in which the fuel processing system is generating the product hydrogen stream from the one or more feedstock streams. As discussed above, in the hydrogen-producing regime, the feedstock delivery system is supplying one or more feedstock streams to the hydrogen-producing region, the hydrogen-producing region is producing the mixed gas stream, and the hydrogen-separation membrane module is separating the mixed gas stream into the product hydrogen stream and the byproduct stream.

Additional examples of an operational (or operating) regime include an "off" regime in which the fuel processing system may not be heated and is not receiving a feedstock stream or producing a mixed gas stream, a "primed" (and/or "idle") regime, in which the fuel processing system may be maintained at an elevated, thermally buffered, temperature but is not receiving the feedstock stream and/or producing the mixed gas stream, and a "restoration" regime, in which fuel processing system 10 is configured to increase hydrogen permeance of hydrogen-separation membrane module 80. In the restoration regime, oxidant delivery system 200 delivers oxidant-containing stream 212 to hydrogen-separation membrane module 80 in situ.

One or more components of hydrogen-producing fuel processing system 10 may be operated differently, may operate differently, and/or may operate under different conditions in the restoration regime and in the hydrogen-producing regime. For example, in the restoration regime, feedstock delivery system 22 may cease delivering feedstock streams 16 to hydrogen-producing region 19, hydrogen-producing region 19 may cease producing and delivering mixed gas stream 20 to hydrogen-separation membrane module 80, and hydrogen-separation membrane module 80 may cease separating mixed gas stream 20 into product hydrogen stream 14 and byproduct stream 68. Similarly, oxidant delivery system 200 may be halted and/or may cease delivering oxidant-containing stream 212 to hydrogen-separation membrane module 80 in the hydrogen-producing regime.

Additionally, various components of fuel processing system 10 may be maintained at different temperatures in the hydrogen-producing regime and the restoration regime. In particular, each component may have a restoration temperature that is optimized or otherwise selected for operation in the restoration regime, and each component may have a hydrogen-producing temperature that is optimized or otherwise selected for the restoration regime, such as the temperatures discussed herein. In particular, heating assembly 91 may maintain one or more components at the respective restoration temperatures in the restoration regime, and heating assembly 91 may maintain one or more components at the respective hydrogen-producing temperatures in the hydrogen-producing regime. Alternatively, one or more components of fuel processing system 10 may not be heated and/or may be maintained at an ambient temperature during the restoration regime.

As an example, heating assembly 91 may be configured to maintain hydrogen-separation membrane module 80 at a predetermined membrane module restoration temperature when fuel processing system 10 is in the restoration regime. As examples, the membrane module restoration temperature may include at least one of at least 200° C., at least 300° C., at least 375° C., at least 400° C., at most 425° C., and/or at most 500° C., and/or in the range of 375° C.-425° C. Additionally or alternatively, heating assembly 91 may be configured to cycle the membrane module restoration temperature through a range of temperatures in a periodic manner, such as between or within any of the above ranges, which may facilitate the passive delivery of oxidant-containing stream 212 to hydrogen-separation membrane module 80 by oxidant delivery system 200. As another example, heating assembly 91 may be configured to maintain at least a portion of oxidant delivery system 200 at a predetermined oxidant delivery system restoration temperature in the restoration regime, such that oxidant delivery system 200 may deliver oxidant-containing stream 212 to hydrogen-separation membrane module 80 at a predetermined oxidant stream temperature. As examples, the oxidant delivery system restoration temperature and/or the oxidant stream temperature may include at least one of at least 200° C., at least 300° C., at least 375° C., at least 400° C., at most 425° C., and/or at most 500° C., and/or in the range of 375°-425° C.

As discussed in more detail herein, fuel processing system 10 may be configured to be selectively transitioned between the hydrogen-producing regime and the restoration regime. In some examples, fuel processing system 10 is transitioned from the hydrogen-producing regime to the restoration regime, and/or simply initiated or operated in the restoration regime based on a routine maintenance cycle. For example, fuel processing system 10 may be operated in, or transitioned to, the restoration regime after fuel processing system 10 has operated in the hydrogen-producing regime for a predetermined duration of hydrogen-producing time. As examples, the predetermined duration of hydrogen-producing time may be at least 50 hours, at least 100 hours, at least 500 hours, at least 1000 hours, at least 2000 hours, at most 5000 hours, and/or at most 10,000 hours. Additionally or alternatively, fuel processing system 10 may be configured to transition from the hydrogen-producing regime to the restoration regime when the hydrogen permeance of hydrogen-separation membrane module 80 is less than, or decreases below, a preselected threshold fraction of a preselected target hydrogen permeance. Examples of the preselected threshold fraction of the preselected target hydrogen permeance include at least 40%, at least 50%, at least 70%, at least 75%, at least 80%, at least 85%, at most 80%, at most 90%, at most 95%, at most 99%, and/or at most 99.5%. For example, fuel processing system 10 may comprise a plurality of sensors that are configured to detect a plurality of operational parameters of various components of fuel processing system 10, and fuel processing system 10 may be configured to selectively transition between the hydrogen-producing regime and the restoration regime based on input from the plurality of sensors. In the present disclosure, reference may be made to various preselected target values, such as the preselected target hydrogen permeance. As discussed herein, the preselected target values may be, may be based upon, and/or may include particular optimized system values, ideal system values, desired system values, and/or maximum or minimum threshold system values. The preselected target values may be stored in the controller and/or may be selected, designated, and/or established by any suitable party such as a manufacturer and/or the system operator.

Turning now to FIG. 2, illustrated therein is a schematic representation showing examples of at least a portion of the hydrogen-producing fuel processing systems 10 that are illustrated and discussed herein with reference to FIG. 1, as well as examples of various sensors 110 that may be included in or utilized with fuel processing systems 10. Sensors 110 may be included in and/or associated with any suitable component of fuel processing system 10 and/or in any suitable location within fuel processing system 10 and may be configured to detect one or more operational parameters thereof, such as during operation of fuel processing system 10 in the hydrogen-producing regime and/or during operation of fuel processing system 10 in the restoration regime. Sensors 110 may be in communication with controller 100 and may be configured to transmit, be queried for, or otherwise relay status signals 102 to controller 100 that include information respective to at least one operational parameter.

As shown in FIG. 2, fuel processing system 10 may include sensors 110 that are associated with and/or configured to detect operational parameters with respect to feedstock streams 16, hydrogen-producing region 19, mixed gas stream 20, hydrogen-separation membrane module 80, product hydrogen stream 14, buffer tank 78, byproduct stream 68, oxidant delivery system 200, oxidant-containing stream 212, and/or heating assembly 91. Each sensor 110 may be configured to detect any suitable operational parameter of the respective component and/or stream, with examples of operational parameters including pressure, temperature, flow rate, volume, duration of time, voltage, electrical current, power output, power consumption, partial pressure (e.g., partial pressure of hydrogen gas), and/or concentration. As mentioned, sensors 110 may be configured to detect the operational parameters when fuel processing system 10 is operating in the hydrogen-producing regime and/or when fuel processing system 10 is operating in the restoration regime. When fuel processing system 10 is operating in the hydrogen-producing regime, one or more of the operational parameters, either alone or in combination, may be respective to, or responsive to, the hydrogen permeance of hydrogen-separation membrane module 80. As referred to herein, these operational parameters may be referred to as permeance-responsive operational parameters. The permeance-responsive operational parameters may vary corresponding to change in the hydrogen-permeance of hydrogen-separation membrane module 80, such that one or more sensors 110 may be configured to detect an increase or a decrease in hydrogen-permeance of hydrogen-separation membrane module 80 and/or hydrogen-selective membrane(s) 84.

As shown in FIG. 1, controller 100 also may be in communication with sensor(s) 110 associated with one or more components of hydrogen-producing and consuming assemblies 12 that receive hydrogen from fuel processing system 10, and these sensors 110 also may be configured to detect, directly or indirectly, an increase or decrease in hydrogen-permeance of hydrogen-separation membrane module 80 and/or hydrogen-selective membrane(s) 84. As an example, a sensor 110, such as a fuel cell stack ammeter, may be associated with fuel cell stack 40 and configured to detect the electrical current produced by fuel cell stack 40.

Fuel processing system 10 may be configured to selectively transition from the hydrogen-producing regime to the restoration regime responsive to at least one permeance-responsive operational parameter passing a predetermined threshold. In other words, fuel processing system 10 may be configured to selectively transition from the hydrogen-producing regime to the restoration regime when one or more sensors 110 detect that the hydrogen permeance of hydrogen-separation membrane module 80 has decreased below a predetermined hydrogen permeance threshold. In particular, controller 100 may be configured to receive status signals 102 corresponding to the permeance-responsive operational parameters, compare permeance-responsive operational parameters against the predetermined thresholds, and generate one or more control signals 104 to various components of fuel processing system 10 and/or hydrogen-producing and consuming assemblies 12 that transition fuel processing system 10 from the hydrogen-producing regime to the restoration regime responsive to at least one permeance-responsive operational parameter passing a corresponding predetermined threshold. As used herein, predetermined thresholds additionally or alternatively may be referred to as predetermined operational thresholds, as operational thresholds, as thresholds, as predetermined set points, as operational set points, and/or as set points. Examples of permeance-responsive operational parameters include a hydrogen-producing region temperature of the hydrogen-producing region, a reformer temperature of hydrogen-producing region 19, a heating assembly temperature of hydrogen-producing region 19, a pressure of buffer tank 78, a flow rate of product hydrogen stream 14, a pressure of product hydrogen stream 14, a pressure of byproduct stream 68, a flow rate of byproduct stream 68, a pressure of one or more feedstock streams 16, and/or the electrical current produced by fuel cell stack 40. Examples of corresponding sensors 110 include one or more hydrogen-producing region temperature sensors, a product hydrogen stream flow rate sensor, a product hydrogen stream pressure sensor, a buffer tank pressure sensor, a byproduct stream flow rate sensor, a feedstock stream pressure sensor, and/or a fuel cell stack ammeter.

As a more specific example, during operation of fuel processing system 10 in the hydrogen-producing regime, burner assembly 92 may heat hydrogen-producing region 19 to an optimal hydrogen-producing temperature for maximizing hydrogen generation from the reaction of carbon-containing feedstock 18 (e.g., steam reforming) within hydrogen-producing region 19. As shown in FIG. 2, hydrogen-separation membrane module 80 separates the mixed gas stream 20 produced by this reaction into product hydrogen stream 14 and byproduct stream 68, and byproduct stream 68 may be delivered to burner assembly 92 to be combusted therein. Thus, the heat delivered to hydrogen-producing region 19 by burner assembly 92, and thus the temperature of at least a portion of hydrogen-producing region 19, may be responsive to the amount of byproduct stream 68 that is delivered to burner assembly 92. The hydrogen permeance of hydrogen-separation membrane module 80 may influence or at least partially determine the proportion of mixed gas stream 20 that leaves hydrogen-separation membrane module 80 as byproduct stream 68. More specifically, a larger proportion of byproduct stream 68 may be delivered to burner assembly 92 when the hydrogen permeance of hydrogen-separation membrane module 80 is lower, which may cause the temperature of hydrogen-producing region 19 to rise. As such, a temperature of hydrogen-producing region 19, such as a heating assembly temperature and/or a reformer temperature, may be utilized as a permeance-responsive operational parameter. In particular, fuel processing system 10 may be configured to selectively transition from the hydrogen-producing regime to the restoration regime when a hydrogen-producing region temperature of hydrogen-producing region 19 has passed a hydrogen-producing region threshold temperature, such as by being greater than a hydrogen-producing region threshold temperature and/or outside of an acceptable hydrogen-producing region threshold temperature range. As examples, the hydrogen-producing region temperature may be detected by at least one of one or more reformer temperature sensors and a heating assembly temperature sensor. As examples, the hydrogen-producing region threshold temperature may include at least one of at least 450° C., at least 475° C., at least 500° C., at least 550° C., at least 575° C., at most 550° C., at most 600° C., at most 650° C., and/or at most 700° C.

As more examples, the flow rate of product hydrogen stream 14, and/or the pressure buffer tank 78 may lower correspondingly with a decrease in hydrogen permeance of hydrogen-separation membrane module 80. With this in mind, fuel processing system 10 may be configured to selectively transition from the hydrogen-producing regime to the restoration regime responsive to the pressure of the product hydrogen stream and/or the pressure of the buffer tank being less than a predetermined threshold product hydrogen pressure, and/or the flow rate of the product hydrogen stream being less than a preselected threshold fraction of a preselected target product hydrogen flow rate. As yet another example, the pressure of feedstock stream 16 may increase with lower hydrogen permeance of hydrogen-separation membrane module 80, and fuel processing system 10 may be configured to selectively transition from the hydrogen-producing regime to the restoration regime responsive to the pressure of feedstock stream 16 passing a predetermined feedstock stream threshold pressure, such as by being greater than a predetermined feedstock stream threshold pressure and/or being outside of a predetermined feedstock stream threshold pressure range.

As yet another example, the electrical current produced by fuel cell stack 40 may lower correspondingly with a decrease in the flow rate of product hydrogen stream 14. Thus, the electrical current produced by fuel cell stack 40 may lower correspondingly with a decrease in the hydrogen permeance of hydrogen-separation membrane module 80, and fuel processing system 10 may be configured to selectively transition from the hydrogen-producing regime to the restoration regime when the electrical current produced by fuel cell stack 40 is less than a predetermined threshold fuel cell stack current.

Depending on the permeance-responsive operational parameter, the corresponding permeance-responsive operational parameter may be described as passing, being outside of, and/or failing to comply with a predetermined threshold if the value (i.e., magnitude) of the parameter is greater than a corresponding upper threshold value, less than a corresponding lower threshold value, or outside of (i.e., not within) a corresponding threshold value range. As an example, the predetermined hydrogen permeance threshold may be passed when the hydrogen permeance falls below this threshold. As another example, a hydrogen-producing region threshold temperature may be passed when the hydrogen-producing region temperature is greater than an upper threshold (indicating too high of a temperature) and/or when the temperature is lower than a lower threshold (indicating too low of a temperature). When the value of a permeance-responsive operational parameter has not passed its corresponding predetermined threshold, the parameter may be described as complying with the threshold and/or being at or within an acceptable value or range of values.

FIG. 3 schematically represents examples of methods 500 for increasing hydrogen permeance of a hydrogen separation membrane module in situ within a hydrogen-producing fuel processing system. In FIG. 3, some steps are illustrated in dashed boxes, indicating that such steps may be optional or may correspond to an optional version of methods 500. That said, not all methods 500 are required to include the steps that are illustrated in solid boxes. The methods and steps of FIG. 3 are not limiting, and other methods and steps are within the scope of the present disclosure, including methods having greater than or fewer than the number of steps illustrated, as understood from the discussion herein. Each step or portion of method 500 may be performed utilizing the hydrogen-producing fuel processing systems 10, the hydrogen-producing and consuming assemblies 12, and/or portions thereof that are illustrated and discussed herein with reference to FIGS. 1-2. Likewise, any of the features, functions, structures, configurations, characteristics, properties, variants, options, etc. of hydrogen-producing fuel processing systems, hydrogen-producing and consuming assemblies, and/or portions thereof that are discussed herein with reference to FIG. 3 and methods 500 may be included in or otherwise utilized with hydrogen-producing fuel processing systems 10 and/or hydrogen-producing and consuming assemblies 12 according to FIGS. 1 and 2.

As discussed herein, methods 500 additionally or alternatively may be referred to herein as methods for improving, restoring, and/or enhancing the hydrogen permeance and/or the hydrogen permeability of a hydrogen-separation membrane module in situ within a hydrogen-producing fuel processing system. As shown in FIG. 3, methods 500 include operating the fuel processing system in a hydrogen-producing regime at 505, and subsequently operating the fuel processing system in a restoration regime at 545.

Operating the fuel processing system in the hydrogen-producing regime at 505 may include supplying a feedstock stream to a hydrogen-producing region at 510, producing, by the hydrogen-producing region, a mixed gas stream from the feedstock stream and delivering the mixed gas stream to a hydrogen-separation membrane module at 515, and separating, by the hydrogen-separation membrane module, the mixed gas stream into a product hydrogen stream and a byproduct stream at 520. Operating the fuel processing system in the hydrogen-producing regime at 505 optionally may include detecting one or more operational parameters within the fuel processing system and determining whether at least one operational parameter has passed a respective predetermined threshold 525. Methods 500 may include continuing to operate in the hydrogen-producing regime when the operational parameters have not passed the respective predetermined thresholds at 527.

Methods 500 also include transitioning the fuel processing system from the hydrogen-producing regime to a restoration regime when at least one predetermined threshold has been passed at 530. Transitioning the fuel processing system to the restoration regime at 530 may include suspending the hydrogen-producing regime at 535 and/or activating an oxidant delivery system at 540. Operating the hydrogen-producing fuel processing system in the restoration regime at 545 includes delivering, by an oxidant delivery system, an oxidant-containing stream to the hydrogen-separation membrane module at 550, and exposing one or more hydrogen-selective membranes of the hydrogen-separation membrane module to the oxidant-containing stream at 555. Methods 500 further may include transitioning the fuel processing system from the restoration regime back to the hydrogen-producing regime at 560.

Operating the hydrogen-producing fuel processing system in the hydrogen-producing regime at 505 includes generating a product hydrogen stream from the feedstock stream utilizing the hydrogen-producing fuel processing system. The operating the fuel processing system in the hydrogen-producing regime at 505 also may include supplying the product hydrogen stream to a hydrogen-consuming assembly, such as a fuel cell stack. As discussed herein, the fuel processing system may include a heated containment structure that includes an internal compartment that may contain various components of the fuel processing system. With this in mind, the operating the fuel processing system in the hydrogen-producing regime at 505 also may include maintaining a temperature of the internal compartment of the heated containment structure at a heated containment structure hydrogen-producing temperature that may be at least 200° C., at least 250° C., at least 300° C., at least 350° C., at least 375° C., at least 400° C., at least 425° C., at least 450° C., at most 500° C., at most 600° C., and/or in the range of 200 C-600° C. and/or in the range of 375 C-425° C. In particular, the maintaining the internal compartment of the heated containment structure at the heated containment structure hydrogen-producing temperature may include maintaining the various components of the fuel processing system that are contained therein at the heated containment structure hydrogen-producing temperature or one or more greater temperatures.

As shown in FIG. 3, the operating the fuel processing system in the hydrogen-producing regime at 505 includes supplying, by a feedstock delivery system, at least one feedstock stream to a hydrogen-producing region at 510. The supplying the feedstock at 510 may include supplying a carbon-containing feedstock, such as one or more of the carbon-containing feedstocks discussed herein, to the hydrogen-producing region. The supplying the feedstock stream to the hydrogen-producing region at 510 may include utilizing the controller to control the flow rate of the feedstock stream to the hydrogen-producing region by controlling the various valves, pumps, compressors, and/or mass flow controllers that are included in the feedstock delivery system. Additionally or alternatively, the supplying the feedstock stream at 510 also may include supplying additional feedstock streams to the hydrogen-producing region, such as water and/or oxygen gas, depending on the reaction being utilized in the hydrogen-producing region to produce the mixed gas stream.

The operating the fuel processing system in the hydrogen-producing regime at 505 further includes producing, by the hydrogen-producing region, a mixed gas stream containing hydrogen gas as a majority component and delivering the mixed gas stream to the hydrogen-separation membrane module at 515. The producing and delivering the mixed gas stream at 515 may include reacting the feedstock stream, optionally with the additional feedstock streams, within the hydrogen-producing region by utilizing any of the reactions and/or reforming catalysts discussed in more detail herein to produce the mixed gas stream from the feedstock stream. The producing and delivering the mixed gas stream at 515 also may include heating the hydrogen-producing region with a heating assembly, such as a burner assembly, to a hydrogen-producing region hydrogen-producing temperature (such as discussed herein) and/or pressurizing the mixed gas stream.

With continued reference to FIG. 3, the operating in the hydrogen-producing regime at 505 further includes separating, by the hydrogen-separation membrane module, the mixed gas stream into the product hydrogen stream and the byproduct stream at 520. The separating at 520 may include separating the mixed gas stream utilizing any of the hydrogen-separation membrane modules that are discussed in more detail herein. The separating the mixed gas stream at 520 may include receiving the mixed gas stream in the mixed gas region of the hydrogen-separation membrane module and permitting hydrogen gas contained within the mixed gas stream to diffuse through one or more hydrogen-selective membrane(s) to a permeate region of the hydrogen-separation membrane module. The separating the mixed gas stream at 520 also may include delivering the byproduct stream to the burner assembly and/or maintaining the hydrogen-separation membrane module at a hydrogen-separation temperature, examples of which are disclosed herein.

The operating the fuel processing system in the hydrogen-producing regime at 505 may include detecting one or more operational parameters within the fuel processing system and determining whether at least one operational parameter has passed a predetermined threshold at 525. When included, the detecting and determining at 525 may be performed with any suitable sequence or timing within methods 500 and/or within the operating in the hydrogen-producing regime at 505. As examples, the detecting and determining at 525 may be performed substantially simultaneously with and/or subsequent to any other step of the operating in the hydrogen-producing regime. Additionally or alternatively, the detecting and determining at 525 may be performed prior to transitioning to the restoration regime at 530 and/or prior to operating in the restoration regime at 545.

As an example, the detecting and determining at 525 may include detecting a total amount of hydrogen-producing time that the fuel processing system has operated in the hydrogen-producing regime and determining whether the total amount of hydrogen-producing time has passed a predetermined hydrogen-producing time threshold. More specifically, the total amount of hydrogen-producing time may include a continuous duration of time or may include a plurality of time increments that collectively amount to the total hydrogen-producing time and that may be separated by periods of operating of the fuel-processing system in the off regime and/or in the primed regime. As examples, the hydrogen-producing time threshold may include at least one of at least 50 hours, at least 100 hours, at least 500 hours, at least 1000 hours, at least 2000 hours, at most 5000 hours, and/or at most 10,000 hours.

The detecting and determining at 525 additionally or alternatively may include detecting the hydrogen permeance of the hydrogen-separation membrane module and determining whether the hydrogen permeance is at least a predetermined hydrogen-permeance threshold value. Stated differently, the detecting and determining at 525 may include determining whether the hydrogen permeance is at least a preselected threshold fraction of a preselected target hydrogen permeance, such as discussed herein.

More specifically, the detecting and determining at 525 may include detecting one or more permeance-responsive operational parameters within the fuel processing system, such as any of the permeance-responsive operational parameters that are discussed in more detail herein, and determining whether at least one permeance-responsive operational parameter has passed a respective threshold. Examples of the permeance operational parameters include one or more hydrogen-producing temperatures of the hydrogen-producing region, a pressure of the buffer tank, a pressure and/or flow rate of the product hydrogen stream, fuel cell stack current, a pressure of the feedstock stream, a pressure and/or flow rate of the byproduct stream, and/or a flow rate of the feedstock stream. The detecting and determining at 525 also may include utilizing any suitable sensor within the hydrogen-producing fuel processing system and/or within hydrogen-producing and consuming assembly 12, such as one or more hydrogen-producing region temperature sensors, a buffer tank pressure sensor, a product hydrogen stream flow rate sensor, a product hydrogen stream pressure sensor, a byproduct stream pressure sensor, a byproduct stream flow rate sensor, a feedstock stream flow rate sensor, a feedstock stream pressure sensor, and/or a fuel cell stack sensor. The detecting and determining at 525 also may include determining, by a controller, such as any of the controllers discussed in more detail herein, whether any of the operational parameters have passed the respective predetermined threshold, such as by comparing the operational parameters to the respective predetermined thresholds.

The hydrogen-producing region temperature(s) may include one or more reformer temperatures of a reformer of the hydrogen-producing region, a heating assembly temperature, and/or a hydrogen-producing region temperature. The detecting and determining at 525 may include determining whether at least one of these temperatures has passed a predetermined hydrogen-producing region threshold temperature, which may include a predetermined reformer threshold temperature, and/or a predetermined reactor bottom threshold temperature. As an example, when the feedstock stream is methanol, the predetermined hydrogen-producing region temperature threshold may include at least one of at least 450° C., at least 475° C., at least 500° C., at least 550° C., at least 560° C., at least 570° C., at least 575° C., at least 580° C., at least 600° C., at most 625° C., and/or at most 650° C. As another example, when the carbon-containing feedstock is a hydrocarbon, ethanol, or a similar alcohol, the predetermined hydrogen-producing region temperature threshold may include at least one of at least 700° C., at least 750° C., at least 800° C., at least 825° C., at most 850° C., at most 900° C., and/or at most 950° C.

As another example, the detecting and determining at 525 may include detecting a pressure of the buffer tank and/or of the product hydrogen stream and determining whether the pressure of the buffer tank and/or of the product hydrogen stream is at least a preselected threshold fraction of a preselected target product hydrogen pressure. As examples, the preselected threshold fraction of the preselected target product hydrogen pressure may include at least one of at least 25%, at least 50%, at least 60%, at least 70%, at least 75%, at most 80%, at most 85%, at most 90%, at most 95%, at most 99%, and/or at most 99.5%.

As yet another example, the detecting and determining at 525 may include detecting a product hydrogen stream flow rate of the product hydrogen stream and determining whether the product hydrogen stream flow rate is at least a preselected threshold fraction of a preselected target product hydrogen stream flow rate. As examples, the preselected threshold fraction of the preselected target product hydrogen stream flow rate may include at least one of at least 25%, at least 50%, at least 60%, at least 70%, at least 75%, at most 80%, at most 85%, at most 90%, at most 95%, at most 99%, and/or at most 99.5%.

As a further example, the detecting and determining at 525 may include detecting a fuel cell stack current produced by the fuel cell stack and determining whether the fuel cell stack current is at least a preselected threshold fraction of a preselected target fuel cell stack current. As examples, the preselected threshold fraction of the preselected target fuel cell stack current may include at least 25%, at least 50%, at least 60%, at least 70%, at least 75%, at most 80%, at most 85%, at most 90%, at most 95%, at most 99%, and/or at most 99.5%.

As yet a further example, the detecting and determining at 525 may include detecting a feedstock stream pressure of the feedstock stream and determining whether the feedstock stream pressure has passed a preselected threshold fraction of a preselected target feedstock stream pressure. As examples, the preselected threshold fraction of the preselected target feedstock stream pressure may include at least one of at least 100%, at least 102%, at least 105%, at least 110%, at least 120%, at most 130%, at most 150%, and/or at most 200%.

With continued reference to FIG. 3, methods 500 may include continuing to operate the fuel processing system in the hydrogen-producing regime when at least one of the operational parameters has not passed the respective predetermined threshold at 527. More specifically, methods 500 may include the continuing at 527 when at least one of, at least some of, and/or each of the operational parameters are determined during the detecting and determining at 525 to not have passed (i.e., to be within) the respective threshold(s). As more specific examples, methods 500 may include the continuing to operate in the hydrogen-producing regime when the detecting and determining at 525 comprises at least one of determining that the hydrogen-producing time is less than the predetermined hydrogen-producing time threshold, determining that the hydrogen-permeance of the hydrogen-separation membrane module is greater than the preselected threshold fraction of the ideal hydrogen permeance, determining that the product hydrogen stream pressure is at least the preselected threshold fraction of the preselected target product hydrogen stream pressure, determining that the product hydrogen stream flow rate is at least the predetermined threshold of the ideal product hydrogen stream flow rate, determining that one or more of the hydrogen-producing region temperatures are less than the hydrogen-producing region threshold temperature(s), and/or determining that the feedstock stream pressure is less than the threshold fraction of the ideal product hydrogen stream pressure.

When included in methods 500, the continuing at 527 may include continuing to perform the supplying at 510, the producing and delivering the mixed gas stream at 515, the separating the mixed gas stream at 520, and optionally the detecting and determining at 525. The continuing at 527 also may include continuing to supply the product hydrogen stream to a hydrogen-consuming assembly. When included, the continuing at 527 may be performed with any suitable sequence or timing within methods 500, such as substantially simultaneously with, or subsequent to, the detecting and determining at 525, prior to transitioning to the restoration regime at 530, and/or prior to and/or subsequent to operating in the restoration regime at 545.

As shown in FIG. 3, methods 500 include transitioning the hydrogen-producing fuel processing system from the hydrogen-producing regime to the restoration regime when at least one operational parameter has passed the respective predetermined threshold at 530. The transitioning at 530 also may be referred to herein as preparing the fuel processing system for the restoration regime. As an example, the transitioning at 530 may include heating and/or cooling various other components of the fuel processing system, from the respective hydrogen-producing temperatures to the respective restoration temperatures, such as discussed in more detail herein. The heating may be performed utilizing the heating assembly, and the cooling may include suspending heating with the heating assembly and permitting the corresponding component to passively cool or utilizing one or more blowers to actively cool the corresponding component. As a more specific example, the transitioning at 530 may include heating or cooling the hydrogen-separation membrane module from the hydrogen-separation membrane module hydrogen-separation temperature to a hydrogen-separation membrane module restoration temperature. As another example, the transitioning at 530 may include cooling the hydrogen-producing region from the hydrogen-producing region hydrogen-producing temperature to a hydrogen-producing region restoration temperature, such as to avoid damage to the hydrogen-producing region during operating in the restoration regime. As yet another example, the transitioning at 530 may include heating or cooling the heated containment volume from the heated containment volume hydrogen-producing temperature to a heated containment volume restoration temperature.

The transitioning at 530 may include transitioning the fuel processing system from the hydrogen-producing regime to the restoration regime when the detecting and determining at 525 comprises determining that at least one operational parameter has passed the respective predetermined threshold. More specifically, the transitioning from the hydrogen-producing regime to the restoration regime at 530 may be performed when only one of the operational parameters has passed the respective threshold, or only when more than one of the operational parameters have passed the respective predetermined thresholds. Generally speaking, the transitioning at 530 may be performed when it is desired or necessary to increase, improve, and/or restore the hydrogen permeance of the hydrogen-separation membrane module. The transitioning may be performed as a routine or periodic maintenance cycle and/or may be performed responsive to detecting a decrease in the hydrogen permeance of the hydrogen-separation membrane module.

As an example, the transitioning at 530 may be performed when the detecting and determining at 525 comprises determining that the hydrogen-producing time has passed the predetermined hydrogen-producing time threshold. Additionally or alternatively, the transitioning at 530 may be performed when the detecting and determining at 525 comprises determining that the hydrogen permeance of the hydrogen-separation membrane module is less than the preselected threshold fraction of the preselected target hydrogen permeance, such as discussed herein. More specifically, the transitioning at 530 may be performed when the detecting and determining at 525 comprises determining that one or more of the permeance-responsive operational parameters has passed the respective predetermined thresholds.

As more specific examples, the transitioning at 530 may be performed when the detecting and determining at 525 comprises at least one of determining that the product hydrogen stream pressure is less than the preselected threshold fraction of the preselected target product hydrogen stream pressure, determining that the product hydrogen stream flow rate is less than the preselected threshold fraction of the ideal product hydrogen stream flow rate, determining that one or more of the hydrogen-producing region temperatures are greater than the hydrogen-producing region threshold temperature(s), determining that the feedstock stream pressure is greater than the preselected threshold fraction of the ideal feedstock stream pressure, and/or determining that the fuel cell stack current is less than the preselected threshold fraction of the preselected target fuel cell current, such as discussed herein.

When included, the transitioning at 530 may be performed with any suitable sequence or timing within methods 500. As examples, the transitioning from the hydrogen-producing regime to the restoration regime at 530 may be performed subsequent to the operating in the hydrogen-producing regime at 505. More specifically, the transitioning at 530 may be performed subsequent to, and/or responsive to the detecting and determining at 525. The transitioning at 530 also may be performed prior to operating in the restoration regime at 545 and/or prior to transitioning from the restoration regime to the hydrogen-producing regime at 560.

As shown in FIG. 3, the transitioning from the hydrogen-producing regime to the restoration regime may include suspending the hydrogen-producing regime at 535. The suspending the hydrogen-producing regime at 535 also may be referred to herein as pausing the hydrogen-producing regime and/or ceasing the hydrogen-producing regime. The suspending the hydrogen-producing regime at 535 may include pausing or ceasing the supplying the feedstock stream to the hydrogen-producing region at 510, pausing or ceasing the producing the mixed gas stream and delivering the mixed gas stream at 515, and/or pausing or ceasing the separating the mixed gas stream at 520. The suspending at 535 also may include ceasing the supplying the product hydrogen stream to the hydrogen-consuming assembly, and may include supplying hydrogen to the hydrogen-consuming assembly with the hydrogen storage device(s).

The suspending the hydrogen-producing regime at 535 may be performed with any suitable sequence or timing within the transitioning at 530, such as prior to the operating in the restoration regime at 545 and/or prior to the activating the oxidant delivery system at 540.

As shown in FIG. 3, when included, the transitioning from the hydrogen-producing regime to the restoration regime at 530 may include activating the oxidant delivery system at 540. The activating the oxidant delivery system at 540 additionally or alternatively may be referred to as initiating the oxidant delivery system. The activating at 540 may include actuating, and/or supplying electrical power to, various actuators of the oxidant delivery system, such as the oxidant stream inlets, various valves, the fluid handler, one or more pumps, fans, and/or blowers that may be included in the oxidant delivery system. The activating at 540 may include performing the actuating with the controller. The activating the oxidant delivery system at 540 also may include heating the oxidant delivery system with the heating assembly to an oxidant delivery system temperature. Additionally or alternatively, the activating at 540 may include utilizing the fluid handler to pressurize the oxidant-containing stream and/or utilizing the fluid handler to flow air from the air inlet to the oxidant delivery system. The suspending the hydrogen-producing regime at 535 further may include purging or exhausting hydrogen, or hydrogen-containing gas, from at least a portion of the fuel processing system, such as at least the membrane module. In particular, the suspending at 535 may include pausing between the suspending at 535 and the operating in the restoration regime at 545 to permit hydrogen contained within at least a portion of the fuel processing system to exhaust therefrom, such as to prevent undesired contact of the oxidant-containing stream and hydrogen gas within the fuel processing system.

The activating the oxidant delivery system at 540 may be performed with any suitable sequence or timing within methods 500, such as subsequent to the suspending at 535 and/or prior to the operating in the restoration regime at 545.

With continued reference to FIG. 2, methods 500 include operating the fuel processing system in the restoration regime 545. The operating the fuel processing system in the restoration regime at 545 may include increasing, restoring, enhancing, and/or improving the hydrogen permeance of the hydrogen-separation membrane module. The operating the fuel processing system in the restoration regime at 545 additionally or alternatively may include increasing, restoring and/or improving the hydrogen permeance of and/or hydrogen permeability of one or more hydrogen-selective membranes of the hydrogen-separation membrane module.

The operating the fuel processing system in the restoration regime at 545 may include maintaining one or more components of the fuel processing system at the respective restoration temperatures. In some examples, the maintaining the components at the respective restoration temperatures comprises utilizing the heating assembly and/or the heated containment structure to maintain the various components at the respective restoration temperatures. As an example, the operating in the restoration regime may include maintaining the hydrogen-separation membrane module at the membrane module restoration temperature. As examples, the membrane module restoration temperature may include at least of at least 200° C., at least 250° C., at least 300° C., at least 350° C., at least 375° C., at least 400° C., at least 425° C., at least 450° C., at most 500° C., at most 600° C., and/or in the range of 200° C.-600° C. and/or in the range of 375° C.-425° C. As another example, the operating in the restoration regime may include maintaining the hydrogen-producing region at a hydrogen-producing region restoration temperature, which may include at least one of at least 50° C., at least 200° C., at least 250° C., at least 300° C., at least 350° C., at least 375° C., at least 400° C., at least 425° C., at least 450° C., at most 500° C., at most 600° C., and/or in the range of 200° C.-600° C. and/or in the range of 375° C.-425° C. As yet another example, the operating in the restoration regime at 545 may include maintaining the oxidant delivery system at an oxidant delivery temperature. As examples, the oxidant delivery temperature may include at least one of at least 200° C., at least 250° C., at least 300° C., at least 350° C., at least 375° C., at least 400° C., at least 425° C., at least 450° C., at most 500° C., at most 600° C., and/or in the range of 200° C.-600° C. and/or in the range of 375° C.-425° C. As yet a further example, the operating in the restoration regime at 545 may include maintaining the internal compartment of the heated containment structure at a heated containment structure restoration temperature, which may include at least one of at least 200° C., at least 250° C., at least 300° C., at least 350° C., at least 375° C., at least 400° C., at least 425° C., at least 450° C., at most 500° C., at most 600° C., and/or in the range of 200° C.-600° C. and/or in the range of 375° C.-425° C.

The operating the fuel processing system in the restoration regime at 545 also may include operating the system in the restoration regime for a predetermined duration of restoration time, which may include selectively delivering the oxidant-containing stream to the hydrogen-separation membrane module for the predetermined duration of restoration time, which also may be referred to as a predetermined duration of oxidant supply time, exposing the hydrogen-separation membrane module(s) to the oxidant-containing stream for the predetermined duration of restoration time, and/or suspending the hydrogen-producing regime for the predetermined duration of restoration time. As examples, when delivering the oxidant-containing stream at 550 includes actively delivering the oxidant-containing stream, the predetermined duration of restoration time may include at least one of at least 10 minutes, at least 30 minutes, at least 60 minutes, at least 90 minutes, at most 120 minutes, at most 150 minutes, at most 180 minutes, at most 240 minutes, and/or in the range of 60 minutes to 120 minutes. When delivering the oxidant-containing stream at 550 includes passively delivering the oxidant-containing stream, the predetermined duration of restoration time may include at least 60 minutes, at least 120 minutes, at least 240 minutes, at least 480 minutes, at least 720 minutes, at least 1,440 minutes, at least 2,160 minutes, at least 2,880 minutes, at most 720 minutes, at most 1,440 minutes, at most 2,160 minutes, at most 2,880 minutes, at most 3,600 minutes, and/or at most 4,320 minutes.

The operating the hydrogen-producing fuel processing system in the restoration regime at 545 may be performed with any suitable sequence or timing within methods 500. As an example, the operating in the restoration regime at 545 may be performed prior and/or subsequent to the operating in the hydrogen-producing regime at 505. Additionally or alternatively, the operating in the restoration regime at 545 may be performed subsequent to the transitioning from the hydrogen-producing regime to the restoration regime at 530 and/or prior to transitioning from the restoration regime to the hydrogen-producing regime at 560.

As shown in FIG. 3, the operating in the restoration regime at 545 includes delivering, by the oxidant delivery system, the oxidant-containing stream to the hydrogen-separation membrane module in situ at 550. The delivering the oxidant-containing stream at 550 may include delivering the oxidant-containing stream without disconnecting or uninstalling the hydrogen-separation membrane module from the fuel-processing system. Stated differently, the delivering the oxidant-containing stream at 550 may include delivering the oxidant-containing stream to the membrane module while the hydrogen-selective membrane is operably installed in the fuel processing system and/or while the hydrogen-separation membrane module remains operably interconnected within the fuel processing system. The delivering the oxidant-containing stream at 550 may include delivering any suitable oxidant-containing stream that contains any suitable oxidant, such as discussed in more detail herein. As an example, the delivering the oxidant-containing stream at 550 may include delivering an oxidant-containing stream that comprises air, an atmospheric gas composition, and/or an oxidant-containing stream that includes oxygen as the oxidant. As another example, the delivering the oxidant-containing stream at 550 may include drawing, flowing, or releasing, by the oxidant delivery system, the oxidant-containing stream from the air inlet and/or the oxidant storage devices.

The delivering the oxidant-containing stream at 550 may include delivering the oxidant-containing stream to the mixed gas region of the hydrogen-separation membrane module. The delivering the oxidant-containing stream at 550 may include utilizing any of the conduits, valves, the oxidant-containing stream conduits, and/or oxidant stream inlets that are discussed in more detail herein. As examples, the delivering the oxidant-containing stream at 550 may include delivering the oxidant-containing stream directly to the mixed gas region of the hydrogen-separation membrane module, such as via one or more oxidant stream inlets positioned there along, and/or one or more oxidant-stream inlets positioned on one or more of the mixed gas stream inlet and/or the byproduct stream outlet of the hydrogen-separation membrane module.

Additionally or alternatively, the delivering the oxidant-containing stream at 550 may include delivering the oxidant-containing stream to the hydrogen-separation membrane module via one or more oxidant inlets that may be positioned elsewhere in the fuel processing system, such as discussed in more detail herein. As an example, the delivering the oxidant-containing stream at 550 may include delivering the oxidant-containing stream via an oxidant inlet that is positioned upstream of the hydrogen-producing region, along the mixed gas stream conduit, along the mixed gas stream conduit upstream of the mixed gas stream filter, along the byproduct stream conduit, and/or along the byproduct stream conduit upstream of the oxygen-isolation device(s). In view of the above, the delivering the oxidant-containing stream at 550 may include flowing the oxidant-containing stream to and optionally through the membrane module in either or both of the upstream direction and the downstream direction. The delivering the oxidant-containing stream at 550 also may include exhausting the oxidant-containing stream through one or more outlets once the oxidant-containing stream has passed through the hydrogen-separation membrane module.

The delivering the oxidant-containing stream at 550 may include the oxidant delivery system actively delivering the oxidant-containing stream and/or may include the oxidant delivery system passively delivering the oxidant-containing stream. An example of the actively delivering the oxidant-containing stream may include utilizing the fluid handler of the oxidant delivery system to flow, blow, and/or pump the oxidant-containing stream to and optionally through the hydrogen-separation membrane module, such as discussed in more detail herein. An example of passively delivering the oxidant-containing stream to the hydrogen-separation membrane module may include cycling the temperature of the hydrogen-separation membrane module, such as by utilizing the heating assembly, within the membrane module restoration temperature ranges discussed herein to facilitate diffusion of the oxidant-containing stream to and/or through the hydrogen-separation membrane module.

The delivering the oxidant-containing stream at 550 also may include delivering the oxidant-containing stream to the hydrogen-separation membrane module at an oxidant-containing stream flow rate. As examples, when the delivering at 550 comprises actively delivering the oxidant-containing stream, the oxidant-containing stream flow rate may include at least one of at least 0.5 standard liters per minute (SLPM), at least 1 SLPM, at least 1.5 SLPM, at most 1.8 SLPM, at most 2 SLPM, at most 2.5 SLPM, and/or at most 3 SLPM. When the delivering at 550 comprises passively delivering the oxidant-containing stream, the oxidant-containing stream flow rate may include at least one of 0.0001 SLPM, at least 0.001 SLPM, 0.01 SLPM, at least 0.1 SLPM, at least 0.5 SLPM, and/or at most 1 SLPM. The delivering the oxidant-containing stream at 550 also may include maintaining the oxidant-containing stream at an oxidant stream temperature, in which the oxidant stream temperature may be the same as, or at least substantially the same as the oxidant-delivery temperature and/or the hydrogen-separation membrane module restoration temperature. The maintaining the oxidant-containing stream at the delivery temperature may be performed by maintaining the oxidant delivery system at the oxidant-delivery temperature and/or by maintaining the hydrogen-separation membrane module at the hydrogen-separation membrane module restoration temperature.

With continued reference to FIG. 3, the operating the fuel processing system in the restoration regime at 545 also includes selectively exposing at least a portion of at least one hydrogen-selective membrane of the hydrogen-separation membrane module to the oxidant-containing stream. As discussed herein, the hydrogen-separation membrane module may include a plurality of hydrogen-selective membranes. When the hydrogen-separation membrane module includes a plurality of membrane modules, the exposing at 555 may include exposing at least a portion of at least some of and/or each of the hydrogen-selective membranes. The exposing at 555 may include exposing the mixed gas face of the hydrogen-selective membrane(s) to the oxidant-containing stream. More specifically, the exposing at 555 may include flowing the oxidant-containing stream over the mixed gas face of the hydrogen-selective membrane(s).

The exposing the hydrogen-separation membrane(s) to the oxidant-containing stream at 555 may include removing or mitigating at least some of, or all of, the hydrogen-permeance decreasing factors that may be present in or may affect one or more of the hydrogen-selective membrane(s). Stated differently, the exposing at 555 may include treating the hydrogen-selective membrane(s) for the permeance-decreasing factors. As more specific examples, the exposing may include removing, and/or selectively oxidizing permeance-decreasing contaminants that may be present on the hydrogen-selective membrane(s), increasing the active surface area of the hydrogen-selective membrane(s), inducing hydrogen permeance-increasing surface roughness in the hydrogen-selective membrane(s), and/or inducing permeance-increasing microstructural changes in the hydrogen-selective membrane(s), such as discussed in more detail herein.

As shown in FIG. 3, methods 500 may include transitioning the hydrogen-producing fuel processing system from the restoration regime back to the hydrogen-producing regime at 560. When included in methods 500, the transitioning from the restoration regime to the hydrogen-producing regime at 560 may be performed with any suitable sequence or timing within methods 500. As examples, the transitioning at 560 may be performed subsequent to the operating in the restoration regime at 545 and/or responsive to the fuel processing system having operated in the restoration regime for the predetermined duration of restoration time.

The transitioning at 560 may include ceasing or suspending the operating in the restoration regime at 545, which may include ceasing the delivering the oxidant-containing stream to the hydrogen-separation membrane module at 550 and ceasing the exposing at 555. When the fuel processing system includes the oxygen-isolation device, the transitioning at 560 may include supplying hydrogen to the oxygen-isolation device or dosing the oxygen-isolation device with hydrogen. The supplying hydrogen to the oxygen-isolation device may be performed to chemically reduce the oxygen-isolation device, remove oxygen that was sorbed in the oxygen-isolation device during the operating in the restoration regime at 545. The supplying hydrogen to the oxygen-isolation device may include supplying stored hydrogen or may include supplying hydrogen produced by the hydrogen-producing region.

The transitioning to the fuel processing system from the restoration regime to the hydrogen-producing regime at 560 also may include initiating and/or restoring the hydrogen-producing regime. In particular, the transitioning at 560 may include initiating or resuming the supplying the feedstock stream, by the feedstock supply system, to the hydrogen-producing region at 510, initiating or resuming the producing, by the hydrogen-producing region, the mixed gas stream and delivering the mixed gas stream to the hydrogen-separation membrane module at 515, and/or initiating or resuming the separating the mixed gas stream, by the hydrogen-separation membrane module, into the product hydrogen stream and the byproduct stream at 520.

The transitioning from the restoration regime to the hydrogen-producing regime at 560 also may include purging the oxidant-containing stream from the fuel processing system, and/or one or more conduits, components, valves, etc., thereof, such as by utilizing the mixed gas stream and/or the byproduct stream. The transitioning from the restoration regime to the hydrogen-producing regime further may include heating and/or cooling one or more components of the fuel processing system from the respective restoration temperatures to the respective hydrogen-producing temperatures, which may include utilizing the heating assembly and/or one or more blowers. As more specific examples, the transitioning at 560 may include heating the hydrogen-producing region from the hydrogen-producing region restoration temperature to the hydrogen producing region hydrogen-producing temperature, heating or cooling the hydrogen-separation membrane module from the membrane module restoration temperature to the hydrogen-separation temperature, and/or heating or cooling the internal compartment of the heated containment structure from the heated containment structure restoration temperature to the heated containment structure hydrogen-producing temperature.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A hydrogen-producing fuel processing system, the system comprising:
  a hydrogen-producing region configured to produce from a feedstock stream a mixed gas stream that includes hydrogen as a majority component;
  a hydrogen-separation membrane module including at least one hydrogen-selective membrane and configured to receive at least a portion of the mixed gas stream and to separate the mixed gas stream into a product hydrogen stream and a byproduct stream; and
  an oxidant delivery system configured to selectively deliver an oxidant-containing stream to the hydrogen-separation membrane module in situ and selectively expose at least a portion of the at least one hydrogen-selective membrane to the oxidant-containing stream to increase a hydrogen permeance of the at least one hydrogen-selective membrane.

A2. The system of paragraph A1, wherein the at least one hydrogen-selective membrane separates the hydrogen-separation membrane module into a mixed gas region and a permeate region, wherein the mixed gas stream is received within the mixed gas region, wherein the at least one hydrogen-selective membrane is configured to permit hydrogen gas contained within the mixed gas stream to diffuse through the at least one hydrogen-selective membrane to the permeate region to separate the mixed gas stream into the product hydrogen stream and the byproduct stream, and wherein the byproduct stream is the portion of the mixed gas stream that does not diffuse through the at least one hydrogen-selective membrane and the product hydrogen stream is the portion of the mixed gas stream that diffuses through the at least one hydrogen-selective membrane.

A3. The system of paragraph A3, wherein the oxidant delivery system is configured to deliver the oxidant-containing stream to the mixed gas region of the hydrogen-separation membrane module.

A4. The system of any of paragraphs A2-A3, wherein the at least one hydrogen-selective membrane comprises a mixed gas face and an opposed permeate face, wherein the mixed gas face is positioned in the mixed gas region of the hydrogen-separation membrane module and the permeate face is positioned in the permeate region of the hydrogen-separation membrane module, and wherein the oxidant delivery system is configured to selectively expose the mixed gas face of the at least one hydrogen-selective membrane to the oxidant-containing stream.

A5. The system of any of paragraphs A1-A4, wherein the oxidant delivery system comprises one or more oxidant stream inlets through which the oxidant delivery system is configured to flow the oxidant-containing stream to the hydrogen-separation membrane module, wherein the one or more oxidant stream inlets are positioned in one or more of upstream of the hydrogen-producing region, downstream of the hydrogen-producing region, along a mixed gas stream conduit, upstream of a mixed gas stream filter, along a/the mixed gas region of the hydrogen-separation membrane module, along a byproduct stream conduit, along a byproduct stream outlet of the hydrogen-separation membrane module, along a mixed gas stream inlet of the hydrogen-separation membrane module, and upstream of one or more oxygen-isolation devices that are positioned along the byproduct stream conduit.

A6. The system of any of paragraphs A1-A5, wherein the hydrogen-separation membrane module comprises a plurality of hydrogen-selective membranes, and wherein the oxidant delivery system is configured to deliver the oxidant-containing stream to at least a subset of the plurality of hydrogen-selective membranes or to each oxidant-containing stream to each hydrogen-selective membrane of the plurality of hydrogen-selective membranes.

A7. The system of any of paragraphs A1-A6, wherein the oxidant delivery system is configured to flow the oxidant-containing stream in one or more of in an upstream direction and in a downstream direction.

A8. The system of any of paragraphs A1-A7, wherein the oxidant delivery system is configured to deliver the oxidant-containing stream to the hydrogen-separation membrane module while the hydrogen-separation membrane module is operably installed within the hydrogen-producing fuel processing system.

A9. The system of any of paragraphs A1-A8, wherein the oxidant delivery system is configured to deliver the oxidant-containing stream to the hydrogen-separation membrane module for a predetermined duration of oxidant supply time, and wherein the predetermined duration of oxidant supply time includes at least one of at least 10 minutes and at most 240 minutes.

A10. The system of paragraph A9, wherein the duration of oxidant supply time includes at least one of at least 60 minutes and at most 4,320 minutes.

A11. The system of any of paragraphs A1-A10, wherein the oxidant delivery system is configured to deliver the oxidant-containing stream with a predetermined oxidant-containing stream flow rate.

A12. The system of paragraph A11, wherein the oxidant-containing stream flow rate includes at least one of at least 0.0001 standard liters per minute and at most 3 standard liters per minute.

A13. The system of any of paragraphs A1-A12, wherein the oxidant-containing stream includes oxygen as an oxidant.

A14. The system of any of paragraphs A1-A13, wherein the oxidant-containing stream includes an atmospheric gas composition.

A15. The system of any of paragraphs A1-A14, wherein the oxidant-containing stream is enriched in oxygen relative to an/the atmospheric gas composition.

A16. The system of any of paragraphs A1-A14, wherein the oxidant-containing stream is depleted in oxygen relative an/the atmospheric gas composition.

A17. The system of any of paragraphs A1-A16, wherein the hydrogen-producing fuel processing system is configured to operate in a hydrogen-producing regime and in a restoration regime, wherein the hydrogen-producing fuel processing system is configured to generate hydrogen in the hydrogen-producing regime, and wherein the hydrogen-producing fuel processing system is configured to increase hydrogen permeance of the hydrogen-separation membrane module in the restoration regime.

A18. The system of paragraph A17, further comprising a heating assembly that is configured to maintain one or more components of the hydrogen-producing fuel processing system at one or more predetermined restoration regime temperatures when the system is operated in the restoration regime.

A19. The system of paragraph A18, wherein the heating assembly is configured to maintain the hydrogen-separation membrane module at a predetermined membrane module restoration temperature when the hydrogen-producing fuel processing system is in the restoration regime.

A20. The system of paragraph A19, wherein the predetermined membrane module restoration temperature includes at least one of at least 200° C. and at most 600° C.

A21. The system of paragraph A20, wherein the predetermined membrane module restoration temperature includes at least one of at least 375° C. and at most 425° C.

A22. The system of any of paragraphs A18-A21, wherein the heating assembly is configured to maintain the temperature of at least a portion of the oxidant delivery system at a predetermined oxidant delivery system restoration temperature in the restoration regime, such that the oxidant delivery system delivers the oxidant-containing stream to the hydrogen-separation membrane module at a predetermined oxidant stream temperature range.

A23. The system of paragraph A22, wherein the predetermined oxidant delivery system restoration temperature includes at least one of at least 200° C. and at most 600° C.

A24. The system of paragraph A23, wherein the predetermined oxidant stream temperature range includes at least one of at least 375° C. and at most 425° C.

A25. The system of any of paragraphs A1-A24, wherein the oxidant delivery system is configured to actively deliver the oxidant-containing stream to the hydrogen-separation membrane module.

A26. The system of paragraph A25, wherein the oxidant delivery system comprises a gas handler that is configured to flow the oxidant-containing stream across a/the mixed gas region of the hydrogen-separation membrane module.

A27. The system of any of paragraphs A1-A26, wherein the oxidant delivery system is configured to passively deliver the oxidant-containing stream to the hydrogen-separation membrane module.

A28. The system of paragraph A27, wherein the oxidant delivery system is configured to utilize temperature cycling within the hydrogen-separation membrane module to flow the oxidant-containing stream across the mixed gas region of the hydrogen-separation membrane module.

A29. The system of any of paragraphs A1-A28, wherein the oxidant delivery system is configured to increase the hydrogen permeance of the at least one hydrogen-selective membrane by selectively removing permeance-decreasing contaminants from the at least one hydrogen-selective membrane.

A30. The system of paragraph A29, wherein the oxidant delivery system is configured to desorb the permeance-decreasing contaminants from the at least one hydrogen-selective membrane.

A31. The system of any of paragraphs A29-A30, wherein the oxidant delivery system is configured to selectively oxidize the permeance-decreasing contaminants to remove the permeance-decreasing contaminants from the at least one hydrogen-selective membrane.

A32. The system of any of paragraphs A29-A31, wherein the permeance-decreasing contaminants include one or more of chemically bound contaminants, physically bound contaminants, chemically reacted contaminants, and interstitial contaminants, and wherein the oxidant delivery system is configured to remove at least one of the chemically bound contaminants, the physically bound contaminants, the chemically reacted contaminants, and the interstitial contaminants.

A33. The system of any of paragraphs A1-A32, wherein the oxidant delivery system is configured to increase hydrogen permeance of the at least one hydrogen-selective membrane by increasing an active surface area of the at least one hydrogen-selective membrane.

A34. The system of any of paragraphs A1-A33, wherein the oxidant delivery system is configured to increase the hydrogen permeance of the hydrogen-separation membrane module.

A35. The system of any of paragraphs A1-A34, wherein the hydrogen-producing fuel-processing system is configured to operate in a/the hydrogen-producing regime and in a/the restoration regime, wherein the hydrogen-producing fuel processing system is configured to generate hydrogen in the hydrogen-producing regime, wherein the hydrogen-producing fuel processing system is configured to increase hydrogen permeance of the hydrogen-separation membrane module in the restoration regime, wherein the hydrogen-producing fuel processing system is configured to selectively transition between the restoration regime and the hydrogen-producing regime.

A36. The system of any of paragraphs A1-A35, wherein the hydrogen-producing fuel processing system comprises a plurality of sensors that are configured to detect a plurality of operational parameters within the hydrogen-producing fuel processing system.

A37. The system of paragraph A36, wherein the plurality of operational parameters comprises at least one permeance-responsive operational parameter that varies responsive to a decrease in a/the hydrogen permeance of the hydrogen-separation membrane module, and wherein at least one sensor of the plurality of sensors is configured to detect the permeance-responsive operational parameter to detect a decrease in hydrogen permeance in the hydrogen-separation membrane module.

A38. The system of paragraph A37, when depending from paragraph A35, wherein the system is configured to selectively transition from the hydrogen-producing regime to the restoration regime when the at least one permeance-responsive operational parameter has passed a predetermined threshold.

A39. The system of paragraph A38, wherein the at least one permeance-responsive operational parameter includes at least one of:
  i) a reformer temperature of the hydrogen-producing region;
  ii) a heating assembly temperature of the hydrogen-producing region;
  iii) a flow rate of the product hydrogen stream;
  iv) a pressure of a buffer tank;
  v) a pressure of a/the feedstock stream; and
  vi) a fuel cell stack current of a fuel cell stack that receives the product hydrogen stream from the membrane module;
wherein the at least one sensor includes at least one of:
  i) a reformer temperature sensor configured to detect the reformer temperature of the hydrogen-producing region;
  ii) a heating assembly temperature sensor configured to detect the heating assembly temperature of the hydrogen-producing region;

iii) a product hydrogen stream flow rate sensor configured to detect the flow rate of the product hydrogen stream;
iv) a buffer tank pressure sensor configured to detect the pressure of the buffer tank;
v) a feedstock stream pressure sensor configured to detect the pressure of the feedstock stream; and
vi) a fuel cell stack ammeter configured to detect the fuel cell stack current produced by the fuel cell stack.

A40. The system of any of paragraphs A1-A39, further comprising a controller that is in communication with a/the at least one sensor and one or more actuators of the hydrogen-producing fuel processing system.

A41. The system of paragraph A40, when depending from any of paragraphs A38-A39, wherein the controller is configured to selectively transition the hydrogen-producing fuel processing system from the hydrogen-producing regime to the restoration regime responsive to the at least one permeance-responsive operational parameter passing the predetermined threshold.

A42. The system of any of paragraphs A40-A41, wherein the controller is configured to perform the methods of any of paragraphs B1-B35.

B1. A method of increasing hydrogen permeance of a hydrogen-separation membrane module in situ within a hydrogen-producing fuel processing system, the method comprising:
operating the hydrogen-producing fuel processing system in a hydrogen-producing regime, comprising:
supplying, by a feedstock delivery system, a feedstock stream to a hydrogen-producing region;
producing, by the hydrogen-producing region, a mixed gas stream containing hydrogen gas as a majority component and delivering the mixed gas stream to the hydrogen-separation membrane module;
separating, by the hydrogen-separation membrane module, the mixed gas stream into a product hydrogen stream and a byproduct stream; and
operating the hydrogen-producing fuel processing system in a restoration regime, comprising:
delivering, by an oxidant delivery system, an oxidant-containing stream to the hydrogen-separation membrane module in situ; and
selectively exposing at least a portion of at least one hydrogen-selective membrane of the hydrogen-separation membrane module to the oxidant-containing stream.

B2. The method of paragraph B1, further comprising:
detecting one or more operational parameters within the hydrogen-producing fuel processing system during the operating in the hydrogen-producing regime, and determining whether at least one operational parameter of the one or more the operational parameters has passed a respective predetermined threshold.

B3. The method of paragraph B2, further comprising transitioning the hydrogen-producing fuel processing system from the hydrogen-producing regime to the restoration regime when the determining comprises determining that an operational parameter of the one or more operational parameters has passed the respective predetermined threshold.

B4. The method of paragraph B3, wherein the transitioning the hydrogen-producing fuel processing system from the hydrogen-producing regime to the restoration regime comprises activating the oxidant delivery system.

B5. The method of any of paragraphs B1-B4, wherein the method comprises continuing to operate under the hydrogen-producing regime when each operational parameter is within the respective predetermined threshold.

B6. The method of any of paragraphs B2-B5, wherein at least one of the one or more operational parameters is a permeance-responsive operational parameter.

B7. The method of any of paragraphs B2-B6, wherein the determining comprises determining whether a hydrogen-producing region temperature of the hydrogen-producing region has passed a predetermined hydrogen-producing region threshold temperature, and wherein the transitioning comprises transitioning the hydrogen-producing fuel processing system from the hydrogen-producing regime to the restoration regime when the hydrogen-producing region temperature has passed the predetermined hydrogen-producing region threshold temperature.

B8. The method of paragraph B7, wherein the hydrogen-producing region threshold temperature includes at least one of at least 550° C. and at most 650° C.

B9. The method of any of paragraphs B2-B8, wherein the determining comprises determining whether a product hydrogen stream pressure of the product hydrogen stream is at least a preselected threshold fraction of a preselected target product hydrogen stream pressure, and wherein the transitioning comprises transitioning the hydrogen-producing fuel processing system from the hydrogen-producing regime to the restoration regime when the product hydrogen stream pressure is less than the preselected threshold fraction of the preselected target product hydrogen stream pressure.

B10. The method of paragraph B9, wherein the preselected threshold fraction of the preselected target product hydrogen stream pressure includes at least one of at least 25%, at least 50%, at least 60%, at least 70%, at least 75%, at most 80%, at most 85%, at most 90%, at most 95%, at most 99%, and/or at most 99.5%.

B11. The method of any of paragraphs B2-B10, wherein the determining comprises determining whether a feedstock stream pressure of the feedstock stream has passed a preselected threshold fraction of a preselected target feedstock stream pressure, and wherein the transitioning comprises transitioning the hydrogen-producing fuel processing system from the hydrogen-producing regime to the restoration regime when the feedstock stream pressure has passed the preselected threshold fraction of the preselected target feedstock stream pressure.

B12. The method of paragraph B11, wherein the preselected threshold fraction of the preselected target feedstock stream pressure includes at least one of at least 100%, at least 102%, at least 105%, at least 110%, at least 120%, at most 130%, at most 150%, and/or at most 200%.

B13. The method of any of paragraphs B2-B12, wherein the determining comprises determining whether a hydrogen permeance of the hydrogen-separation membrane module is at least a preselected threshold fraction of a preselected target hydrogen permeance, and wherein the transitioning comprises transitioning the hydrogen-producing fuel processing system from the hydrogen-producing regime to the restoration regime when the hydrogen permeance of the hydrogen-separation membrane module is less than the preselected threshold fraction of the preselected target hydrogen permeance.

B14. The method of paragraph B13, wherein the preselected threshold fraction of the preselected target hydrogen permeance includes at least one of at least 25%, at least 50%, at least 60%, at least 70%, at least 75%, at least 80%, at least 85%, at most 80%, at most 85%, at most 90%, at most 95%, at most 99%, and/or at most 99.5%.

B15. The method of any of paragraphs B1-B14, wherein the operating the hydrogen-producing fuel processing system in the restoration regime comprises increasing hydrogen permeance of the at least one hydrogen-selective membrane.

B16. The method of any of paragraphs B1-B15, wherein the operating the hydrogen-producing fuel processing system in the restoration regime further comprises maintaining the hydrogen-separation membrane module at a membrane restoration temperature.

B17. The method of paragraph B16, wherein the membrane restoration temperature includes at least one of at least 200° C. and at most 600° C.

B18. The method of paragraph B17, wherein the membrane restoration temperature includes at least one of at least 375° C. and at most 425° C.

B19. The method of any of paragraphs B1-B18, wherein the operating the hydrogen-producing fuel processing system in the restoration regime further comprises maintaining the oxidant-containing stream at an oxidant stream temperature during the selectively exposing.

B20. The method of paragraph B19, wherein the oxidant stream temperature includes at least one of at least 200° C. and at most 600° C.

B21. The method of paragraph B20, wherein the oxidant stream temperature includes at least one of at least 375° C. and at most 425° C.

B22. The method of any of paragraphs B1-B21, wherein the delivering the oxidant-containing stream comprises delivering the oxidant-containing stream at an oxidant-containing stream flow rate, wherein the oxidant-containing stream flow rate includes at least one of at least 0.0001 standard liters per minute and at most 3 standard liters per minute.

B23. The method of any of paragraphs B1-B22, wherein the delivering the oxidant-containing stream is performed while the hydrogen-separation membrane module is operatively installed within the hydrogen-producing fuel processing system.

B24. The method of any of paragraphs B1-B23, wherein the operating the hydrogen-producing fuel processing system in the restoration regime is performed for a predetermined duration of restoration time.

B25. The method of paragraph B24, wherein the predetermined duration of restoration time includes at least one of at least 60 minutes and at most 2,880 minutes, and optionally at least 60 minutes and at most 4,320 minutes.

B26. The method of any of paragraphs B24-B25, wherein the predetermined duration of restoration time includes at least one of at least 60 minutes and at most 120 minutes.

B27. The method of any of paragraphs B1-B26, wherein the transitioning the hydrogen-producing fuel processing system from the hydrogen-producing regime to the restoration regime further comprises suspending the hydrogen-producing regime.

B28. The method of paragraph B27, wherein the suspending comprises suspending the supplying the feedstock stream to the hydrogen-producing region.

B29. The method of any of paragraphs B27-B28, wherein the suspending comprises suspending the producing the mixed gas stream.

B30. The method of any of paragraphs B1-B29, further comprising transitioning the hydrogen-producing fuel processing system from the restoration regime to the hydrogen-producing regime.

B31. The method of paragraph B30, wherein the transitioning the hydrogen-producing fuel system from the restoration regime to the hydrogen-producing regime comprises resuming the hydrogen-producing regime.

B32. The method of paragraph B31, wherein the resuming the hydrogen-producing regime comprises:
supplying, by the feedstock delivery system, the feedstock stream to the hydrogen-producing region;
producing, by the hydrogen-producing region, the mixed gas stream containing hydrogen gas as the majority component and delivering the mixed gas stream to the hydrogen-separation membrane module; and
separating, by the hydrogen-separation membrane module, the mixed gas stream into the product hydrogen stream and the byproduct stream.

B33. The method of any of paragraphs B30-B32, wherein the transitioning the hydrogen-producing fuel system from the restoration regime to the hydrogen-producing regime comprises suspending the restoration regime.

B34. The method of paragraph B33, wherein the suspending the restoration regime comprises:
ceasing, by the oxidant delivery system, the delivering the oxidant-containing stream to the hydrogen-separation membrane module; and
ceasing the selectively exposing at least the portion of the at least one hydrogen-selective membrane of the hydrogen-separation membrane module to the oxidant-containing stream.

B35. The method of any of paragraphs B1-B34, wherein the hydrogen-producing fuel processing system includes the hydrogen-producing fuel processing system of any of paragraphs A1-A42.

INDUSTRIAL APPLICABILITY

The systems and methods disclosed herein are applicable to hydrogen- and energy-production industries, including the fuel cell industries.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A hydrogen-producing fuel processing system, the system comprising:
   a hydrogen-producing region configured to produce a mixed gas stream that includes hydrogen gas as a majority component;
   a hydrogen-separation membrane module including at least one hydrogen-selective membrane and configured to receive at least a portion of the mixed gas stream and to separate the mixed gas stream into a product hydrogen stream and a byproduct stream; wherein the product hydrogen stream contains a greater concentration of hydrogen gas than the mixed gas stream; and wherein the byproduct stream contains a lower concentration of hydrogen gas than the mixed gas stream;
   a heating assembly configured to maintain the hydrogen-separation membrane module at a predetermined hydrogen-separation membrane module restoration temperature range of at least 200° C.; and
   an oxidant delivery system configured to selectively deliver an oxidant-containing stream to the hydrogen-separation membrane module in situ to selectively expose at least a portion of the at least one hydrogen-selective membrane to the oxidant-containing stream to increase a hydrogen permeance of the at least one hydrogen-selective membrane; and
   wherein the hydrogen-producing fuel processing system is configured to selectively and sequentially operate in a hydrogen-producing regime and in a restoration regime; wherein the hydrogen-producing fuel processing system is configured to generate hydrogen gas in the hydrogen-producing regime; wherein the hydrogen-producing fuel processing system is configured to increase hydrogen permeance of the hydrogen-separation membrane module in the restoration regime; wherein in the restoration regime, the heating assembly maintains the hydrogen-separation membrane module at the predetermined hydrogen-separation membrane module restoration temperature range and the oxidant delivery system delivers the oxidant-containing stream to the hydrogen-separation membrane module; and wherein the heating assembly is configured to maintain one or more components of the hydrogen-producing fuel processing system in one or more predetermined restoration temperature ranges when the hydrogen-producing fuel processing system is operated in the restoration regime.

2. The system of claim 1, wherein the at least one hydrogen-selective membrane separates the hydrogen-separation membrane module into a mixed gas region and a permeate region, wherein the mixed gas stream is received within the mixed gas region, wherein the at least one hydrogen-selective membrane is configured to permit hydrogen gas contained within the mixed gas stream to diffuse through the at least one hydrogen-selective membrane to the permeate region to separate the mixed gas stream into the product hydrogen stream and the byproduct stream, wherein the byproduct stream is a portion of the mixed gas stream that does not diffuse through the at least one hydrogen-selective membrane and the product hydrogen stream is a portion of the mixed gas stream that diffuses through the at least one hydrogen-selective membrane, and wherein the oxidant delivery system is configured to deliver the oxidant-containing stream to the mixed gas region of the hydrogen-separation membrane module.

3. The system of claim 2, wherein the at least one hydrogen-selective membrane comprises a mixed gas face and an opposed permeate face, wherein the mixed gas face is positioned in the mixed gas region of the hydrogen-separation membrane module and the permeate face is positioned in the permeate region of the hydrogen-separation membrane module, and wherein the oxidant delivery system is configured to selectively expose the mixed gas face of the at least one hydrogen-selective membrane to the oxidant-containing stream.

4. The system of claim 1, wherein the at least one hydrogen-selective membrane is at least substantially formed from a palladium alloy.

5. The system of claim 1, wherein the at least one hydrogen-selective membrane has a thickness, and wherein the thickness of the at least one hydrogen-selective membrane is less than 10 microns.

6. The system of claim 1, wherein the oxidant delivery system comprises one or more oxidant stream inlets through which the oxidant delivery system is configured to flow the oxidant-containing stream to the hydrogen-separation membrane module, wherein the one or more oxidant stream inlets includes an oxidant stream inlet that is positioned upstream of the hydrogen-producing region.

7. The system of claim 6, wherein at least one of the one or more oxidant stream inlets is interconnected with a fuel inlet port of the hydrogen-producing region.

8. The system of claim 6, wherein the hydrogen-producing region includes a reforming catalyst, and further wherein the reforming catalyst is non-pyrophoric.

9. The system of claim 1, wherein the oxidant delivery system comprises one or more oxidant stream inlets through which the oxidant delivery system is configured to flow the oxidant-containing stream to the hydrogen-separation membrane module, wherein the one or more oxidant stream inlets includes an oxidant stream inlet that is positioned downstream of the hydrogen-producing region.

10. The system of claim 1, wherein the oxidant delivery system is configured to deliver the oxidant-containing stream to the hydrogen-separation membrane module while the hydrogen-separation membrane module is operably installed within the hydrogen-producing fuel processing system.

11. The system of claim 1, wherein when the hydrogen-producing fuel processing system is operated in the restoration regime, the oxidant delivery system is configured to deliver the oxidant-containing stream to the hydrogen-separation membrane module for a predetermined duration of oxidant supply time, and wherein the predetermined duration of oxidant supply time is at least one of at least 60 minutes and at most 2,880 minutes.

12. The system of claim 1, wherein when the hydrogen-producing fuel processing system is operated in the restoration regime, the oxidant delivery system is configured to deliver the oxidant-containing stream with a predetermined oxidant-containing stream flow rate, and wherein the oxidant-containing stream flow rate is at least one of at least 0.0001 standard liters per minute and at most 3 standard liters per minute.

13. The system of claim 1, wherein the oxidant-containing stream includes oxygen gas as an oxidant.

14. The system of claim 12, wherein the predetermined restoration temperature range is at least 375° C. and at most 425° C.

15. The system of claim 1, wherein when the hydrogen-producing fuel processing system is operated in the restoration regime, the oxidant delivery system is configured to increase the hydrogen permeance of the at least one hydrogen-selective membrane by selectively removing permeance-decreasing contaminants from the at least one hydrogen-selective membrane.

16. The system of claim 15, wherein when the hydrogen-producing fuel processing system is operated in the restoration regime, the oxidant delivery system is configured to selectively oxidize the permeance-decreasing contaminants to remove the permeance-decreasing contaminants from the at least one hydrogen-selective membrane.

17. The system of claim 1, wherein when the hydrogen-producing fuel processing system is operated in the restoration regime, the oxidant delivery system is configured to increase the hydrogen permeance of the at least one hydrogen-selective membrane by selectively increasing a surface roughness of the at least one hydrogen-selective membrane.

18. A method of increasing hydrogen permeance of a hydrogen-separation membrane module in situ within a hydrogen-producing fuel processing system, the method comprising:
operating the hydrogen-producing fuel processing system of claim 1 in the hydrogen-producing regime, the method comprising:
supplying, by a feedstock delivery system, a feedstock stream to the hydrogen-producing region;
producing, by the hydrogen-producing region, the mixed gas stream containing hydrogen gas as the majority component and delivering the mixed gas stream to the hydrogen-separation membrane module;
separating, by the hydrogen-separation membrane module, the mixed gas stream into the product hydrogen stream and the byproduct stream; and
subsequent to operating the hydrogen-producing fuel processing system in the hydrogen-producing regime, operating the hydrogen-producing fuel processing system in a restoration regime, comprising:
delivering, by the oxidant delivery system, the oxidant-containing stream to the hydrogen-separation membrane module in situ; and
selectively exposing at least the portion of the least one hydrogen-selective membrane of the hydrogen-separation membrane module to the oxidant-containing stream.

19. The method of claim 18, wherein the method further comprises maintaining the hydrogen-separation membrane module at a membrane restoration temperature range of at least 200° C.

20. The method of claim 18, further comprising:
detecting one or more operational parameters within the hydrogen-producing fuel processing system during the operating in the hydrogen-producing regime, and determining whether at least one operational parameter of the one or more operational parameters has passed a respective predetermined threshold; and
transitioning the hydrogen-producing fuel processing system from the hydrogen-producing regime to the restoration regime when the determining comprises determining that an operational parameter of the one or more operational parameters has passed the respective predetermined threshold.

21. The method of claim 18, wherein the one or more operational parameters includes a hydrogen-producing region temperature of the hydrogen-producing region, wherein the determining comprises determining whether the hydrogen-producing region temperature has passed a predetermined hydrogen-producing region threshold temperature, and wherein the predetermined hydrogen-producing region threshold temperature is at least one of at least 550° C. and at most 650° C.

22. The method of claim 20, wherein the one or more operational parameters includes a length of time during which the hydrogen-producing fuel cell system has been operated in the hydrogen-producing regime without being transitioned to the restoration regime, and wherein the determining comprises determining whether the length of time is at least 1000 hours.

23. The method of claim 20, wherein the one or more operational parameters includes a hydrogen permeance of the at least one hydrogen-selective membrane in the hydrogen-separation membrane module, wherein the determining comprises determining whether a hydrogen permeance of the hydrogen-separation membrane module is at least a preselected threshold fraction of a preselected target hydrogen permeance, and wherein the transitioning comprises transitioning the hydrogen-producing fuel processing system from the hydrogen-producing regime to the restoration regime when the hydrogen permeance of the hydrogen-separation membrane module is less than the preselected threshold fraction of the preselected target hydrogen permeance.

24. The method of claim 18, wherein the operating the hydrogen-producing fuel processing system in the restoration regime comprises increasing the hydrogen permeance of the at least one hydrogen-selective membrane.

* * * * *